(12) United States Patent
Lai

(10) Patent No.: US 12,492,824 B2
(45) Date of Patent: Dec. 9, 2025

(54) DUAL DOOR OVEN

(71) Applicant: CONAIR LLC, Stamford, CT (US)

(72) Inventor: Kin Man Lai, Hong Kong (CN)

(73) Assignee: CONAIR LLC, Stamford, CT (US)

( * ) Notice: Subject to any disclaimer, the term of this patent is extended or adjusted under 35 U.S.C. 154(b) by 819 days.

(21) Appl. No.: 17/711,296

(22) Filed: Apr. 1, 2022

(65) Prior Publication Data

US 2023/0314005 A1 Oct. 5, 2023

(51) Int. Cl.
| | |
|---|---|
| F24C 15/00 | (2006.01) |
| F24C 7/06 | (2006.01) |
| F24C 7/08 | (2006.01) |
| F24C 15/02 | (2006.01) |
| F24C 15/16 | (2006.01) |
| F24C 15/32 | (2006.01) |
| F24C 15/14 | (2006.01) |

(52) U.S. Cl.
CPC ............ *F24C 15/007* (2013.01); *F24C 7/067* (2013.01); *F24C 7/085* (2013.01); *F24C 15/02* (2013.01); *F24C 15/16* (2013.01); *F24C 15/322* (2013.01); *F24C 15/14* (2013.01)

(58) Field of Classification Search
CPC ........ F24C 15/007; F24C 7/067; F24C 7/085; F24C 15/02; F24C 15/16; F24C 15/322; F24C 15/14
USPC ............................................ 219/398; 49/109
See application file for complete search history.

(56) References Cited

U.S. PATENT DOCUMENTS

| | | | | |
|---|---|---|---|---|
| 370,849 | A * | 10/1887 | Baxter | F24C 15/02 49/109 |
| 391,574 | A * | 10/1888 | Baxter | F24C 15/02 49/109 |
| 544,772 | A * | 8/1895 | Schill | F24C 15/02 49/109 |
| 544,773 | A * | 8/1895 | Schill | F24C 15/02 49/109 |
| 862,602 | A * | 8/1907 | Baxter | F24C 15/02 126/191 |
| 1,072,809 | A * | 9/1913 | Baxter | E05F 17/004 49/109 |
| 1,388,533 | A * | 8/1921 | Van Horn | E05F 13/02 49/110 |
| 1,398,725 | A * | 11/1921 | Kneier | F24C 15/16 211/153 |

(Continued)

FOREIGN PATENT DOCUMENTS

| | | | | |
|---|---|---|---|---|
| EP | 2295869 | | 3/2011 | |
| EP | 2716977 | A1 * | 4/2014 | ............. F24C 11/00 |

(Continued)

OTHER PUBLICATIONS

International Search Report dated Sep. 20, 2023 from corresponding PCT Application No. PCT/US2023/014683.

*Primary Examiner* — Jimmy Chou
(74) *Attorney, Agent, or Firm* — Grogan, Tuccillo & Vanderleeden, LLP

(57) ABSTRACT

A cooking appliance includes a housing having an internal compartment, a divider positionable within the internal compartment for dividing the internal compartment into a first oven cavity and a second oven cavity, a first heating element configured to heat the first oven cavity, and a second element configured to heat the second oven cavity. The divider is at least one of retractable and/or removable.

14 Claims, 31 Drawing Sheets

(56) References Cited

U.S. PATENT DOCUMENTS

| | | | | |
|---|---|---|---|---|
| 1,722,670 A * | 7/1929 | Lewis | E05F 15/63 | 49/110 |
| 1,755,788 A * | 4/1930 | Morse | E05F 15/611 | 49/264 |
| 1,768,173 A * | 6/1930 | Tucker | E05F 17/004 | 49/110 |
| 1,842,708 A * | 1/1932 | Barnes | F24C 15/023 | 126/339 |
| 1,864,164 A * | 6/1932 | Aldeen | E05D 3/18 | 5/57.1 |
| 2,025,480 A * | 12/1935 | Sponsler | E05F 17/004 | 49/109 |
| 2,707,225 A * | 4/1955 | Pearce | F24C 15/022 | 49/113 |
| 2,708,709 A * | 5/1955 | Pearce | F24C 15/30 | 49/113 |
| 2,823,664 A * | 2/1958 | Evans | F24C 15/28 | 126/299 C |
| 2,879,370 A * | 3/1959 | Kesling | F24C 15/02 | 126/299 C |
| 2,889,825 A * | 6/1959 | Evans | F24C 15/02 | 126/21 R |
| 2,950,911 A * | 8/1960 | Muffly | F25D 23/02 | 49/108 |
| 2,953,419 A * | 9/1960 | Ingolia | F24C 15/022 | 126/190 |
| 3,009,458 A * | 11/1961 | Pearce | A47B 96/16 | 49/108 |
| 3,143,638 A * | 8/1964 | Scott | F24C 7/06 | 312/330.1 |
| 3,196,252 A * | 7/1965 | Weingrad | F27D 11/02 | 219/403 |
| 3,380,110 A * | 4/1968 | Daugirdas | E05F 3/02 | 16/66 |
| 3,655,942 A * | 4/1972 | Tomsic | A47J 37/0635 | 49/145 |
| 3,820,866 A * | 6/1974 | Kaldenberg | F24C 15/023 | 49/386 |
| 3,895,849 A * | 7/1975 | Zehr | A62C 2/12 | 312/324 |
| D287,562 S | 1/1987 | Takada et al. | | |
| 5,061,022 A * | 10/1991 | Meriwether | E05C 7/04 | 49/367 |
| 5,722,202 A * | 3/1998 | Cooper | E05F 17/004 | 49/109 |
| 6,444,954 B1 | 9/2002 | Blankenship | | |
| 6,742,302 B2 * | 6/2004 | Karkkainen | E05F 5/12 | 49/366 |
| 7,087,872 B1 * | 8/2006 | Dobie | H05B 6/745 | 219/685 |
| 7,129,447 B1 * | 10/2006 | Kim | F24C 15/325 | 219/394 |
| 7,183,520 B2 * | 2/2007 | Park | H05B 6/642 | 219/394 |
| 7,766,003 B2 * | 8/2010 | Kim | F24C 7/082 | 219/400 |
| 7,814,897 B2 * | 10/2010 | Larsen | F24C 15/023 | 292/201 |
| 8,212,188 B2 * | 7/2012 | Kim | F24C 15/18 | 219/400 |
| 8,217,314 B2 * | 7/2012 | Kim | F24C 15/325 | 219/400 |
| 8,336,535 B2 * | 12/2012 | Larsen | F24C 15/021 | 126/192 |
| 8,510,991 B2 * | 8/2013 | Collene | F24C 15/023 | 312/405 |
| 8,651,099 B2 * | 2/2014 | Yantis | F24C 15/022 | 126/192 |
| 8,707,945 B2 * | 4/2014 | Hasslberger | F24C 15/006 | 126/21 A |
| 8,905,014 B2 * | 12/2014 | Shaffer | F24C 15/04 | 219/685 |
| 8,944,536 B2 * | 2/2015 | Yantis | E05F 1/10 | 312/319.2 |
| 9,097,429 B2 * | 8/2015 | Nam | F24C 15/16 | |
| 9,255,712 B2 * | 2/2016 | Yantis | F24C 15/02 | |
| 9,335,055 B2 * | 5/2016 | Chilton | F24C 15/02 | |
| 9,651,265 B2 * | 5/2017 | Yantis | F24C 15/023 | |
| 9,696,040 B2 * | 7/2017 | Yoon | F24C 3/124 | |
| 9,874,354 B2 * | 1/2018 | Jadhav | E05F 5/06 | |
| 9,890,957 B2 * | 2/2018 | Yantis | F24C 15/023 | |
| D817,705 S * | 5/2018 | Kim | F24C 15/12 | D7/405 |
| 10,018,364 B2 * | 7/2018 | Yantis | F24C 15/023 | |
| 10,024,541 B2 * | 7/2018 | Wojick | H05B 6/64 | |
| RE47,096 E * | 10/2018 | Bier | H02B 1/28 | |
| 10,292,212 B2 * | 5/2019 | Hall | H05B 6/6417 | |
| 10,429,077 B2 * | 10/2019 | Kaiser | A47J 27/002 | |
| 10,508,817 B2 * | 12/2019 | Yantis | A47B 71/00 | |
| 10,571,134 B2 * | 2/2020 | Weaver | F24C 15/023 | |
| 11,175,048 B2 * | 11/2021 | Murad | F24C 15/325 | |
| 11,585,536 B2 * | 2/2023 | Murad | F24C 15/023 | |
| 11,655,983 B2 * | 5/2023 | Murad | G05D 23/1931 | 126/194 |
| 2006/0096969 A1 * | 5/2006 | Kim | F24C 7/082 | 219/394 |
| 2007/0039605 A1 * | 2/2007 | Larsen | F24C 15/023 | 126/191 |
| 2007/0246036 A1 * | 10/2007 | Larsen | F24C 15/021 | 126/190 |
| 2008/0110449 A1 * | 5/2008 | Brown | F24C 15/006 | 165/104.19 |
| 2009/0145031 A1 * | 6/2009 | Collene | E05F 1/1066 | 49/113 |
| 2010/0139169 A1 * | 6/2010 | Patil | F24C 15/02 | 49/109 |
| 2013/0153570 A1 * | 6/2013 | Carlsson | H05B 6/70 | 219/702 |
| 2014/0070685 A1 * | 3/2014 | Yantis | F24C 15/028 | 312/319.2 |
| 2014/0174301 A1 * | 6/2014 | Moon | F24C 3/004 | 126/39 E |
| 2016/0029829 A1 * | 2/2016 | Klein | A47J 37/08 | 99/332 |
| 2017/0299196 A1 * | 10/2017 | Jadhav | F24C 15/023 | |
| 2022/0404034 A1 * | 12/2022 | Shimel | A47J 36/32 | |
| 2024/0044509 A1 * | 2/2024 | Aneladasu | F24C 15/16 | |

FOREIGN PATENT DOCUMENTS

| | | | |
|---|---|---|---|
| GB | 2267339 | 12/1993 | |
| WO | 2010136849 | 12/2010 | |
| WO | WO-2010136849 A1 * | 12/2010 | F24C 15/16 |

\* cited by examiner

DUAL DOOR OVEN

FIELD OF THE INVENTION

The present invention relates to cooking appliances and, more particularly, to a toaster oven having a variety of different cooking configurations.

BACKGROUND OF THE INVENTION

Various toaster ovens exist for heating and cooking a variety of food items. For example, existing toaster ovens are used for toasting bagels, heating sandwiches, baking desserts, broiling meats and reheating leftovers. Heating and cooking these food items is often accomplished by the operation of upper and lower heating elements within the toaster oven, and temperature control and time control over these heating elements through a user interface or control panel.

While existing toaster ovens are generally suitable for what is regarded as ordinary performance, there is room for improvement in terms of ease of use, performance, cooking capacity and cleanability.

In view of the above, there is a need for a toaster oven that can be selectively configured to provide a variety of different oven cavity configurations.

SUMMARY OF THE INVENTION

It is an object of the present invention to provide a cooking appliance having a plurality of different oven cavity configurations.

It is an object of the present invention to provide a cooking appliance in the form of a toaster oven having a plurality of different oven cavity configurations.

It is another object of the present invention to provide an oven having dual doors for accessing the oven cavity.

These and other objects are achieved by the present invention.

According to an embodiment of the present invention a cooking appliance includes a housing having an internal compartment, a divider positionable within the internal compartment for dividing the internal compartment into a first oven cavity and a second oven cavity, a first heating element configured to heat the first oven cavity, and a second element configured to heat the second oven cavity. The divider is at least one of retractable and/or removable.

According to another embodiment of the present invention a method of operating a cooking appliance having a housing and an internal compartment is provided. The method includes the steps of deploying a divider into the internal compartment to divide the internal compartment into a first oven cavity and a second oven cavity, initiating a first cooking mode to heat the first oven cavity to a first temperature, and initiating a second cooking mode to heat the second oven cavity to a second temperature that is different from the first temperature.

According to yet another embodiment of the present invention, a cooking appliance includes a housing having an internal compartment, a plurality of heating elements within the internal compartment, a first door enclosing a first portion of the internal compartment, and a second door enclosing a second portion of the internal compartment. The first door and the second door are configured such that in a first mode, the first door and the second door can be opened simultaneously by exerting an opening force on only one of the first door and the second door, and in a second mode, one of the first door and the second door can be opened while the other of the first door and the second door is maintained in a closed position.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENTS

Figure 1:
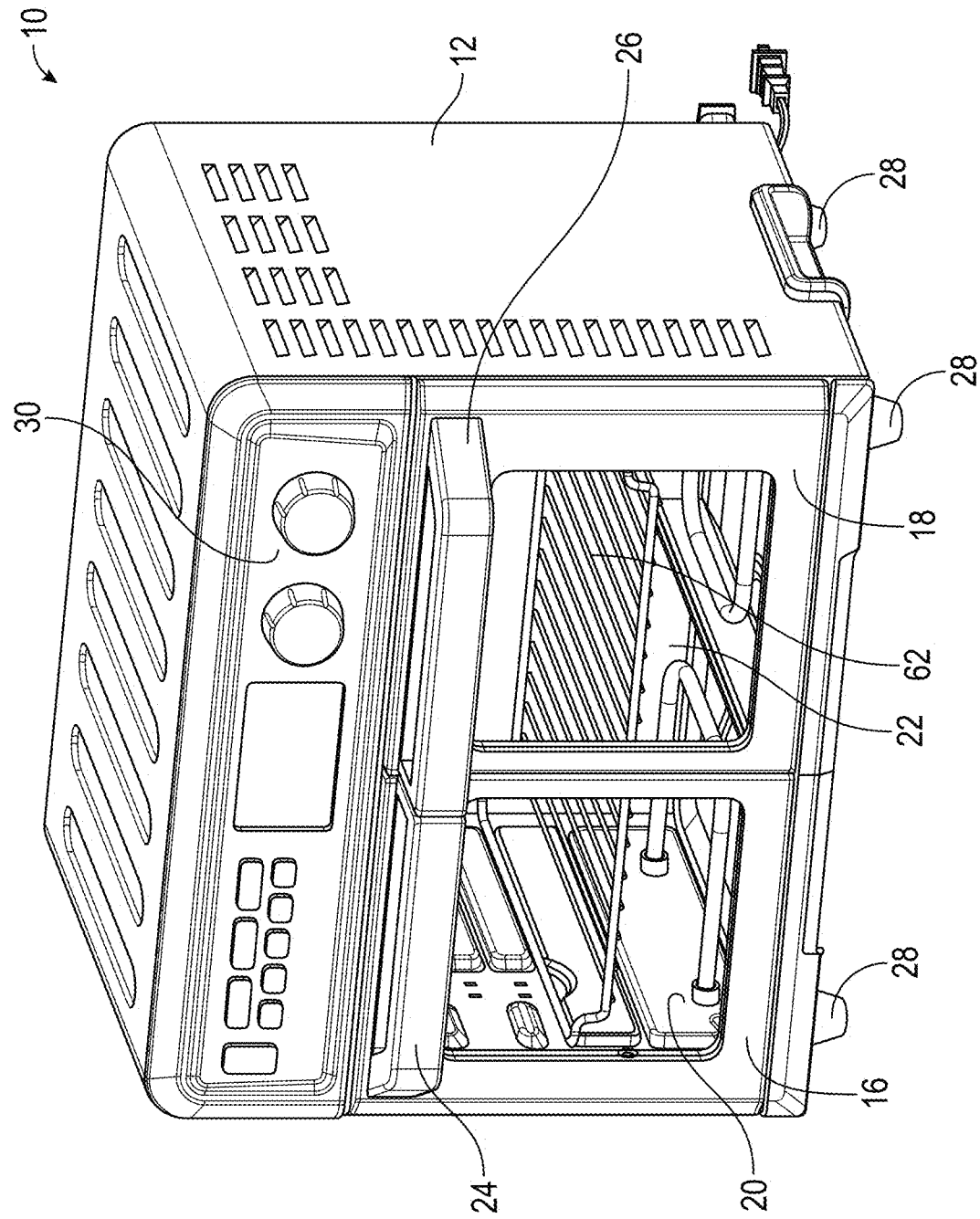
FIG. 1 is a perspective view of a cooking appliance according to an embodiment of the present invention, showing the appliance in a single compartment configuration.

Referring to FIGS. 1-10, a cooking apparatus 10 (also referred to herein as dual door oven 10) according to an embodiment of the present invention is shown. The cooking apparatus 10 generally takes the form of a toaster oven having a thermally insulated housing 12 that defines an internal heating compartment 14. The internal compartment 14 is accessed through first and second doors 16, 18, each having a transparent front panel 20, 22 and a handle 24, 26 located along an upper edge of each door. In an embodiment, the doors 16, 18 are pivotally connected to the housing 12 at their lower edges, and can be opened and closed with respect to the housing 12 via rotation of the doors 16, 18 about a hinge at the lower edges thereof. In the open position shown in FIG. 2, access to the interior compartment 14 is provided. As further shown in FIGS. 1-7, a plurality of feet 28 support the housing 12 in spaced relation to a countertop or other surface. The front of the housing 12 includes a control panel 30 forming a user interface (comprising, for example, a graphic display, such as an LCD, and an array of user controls, e.g., buttons, switches and/or knobs for selecting one or more programmed cooking modes, and/or for manually selecting one or more cooking parameters).

Figure 8:
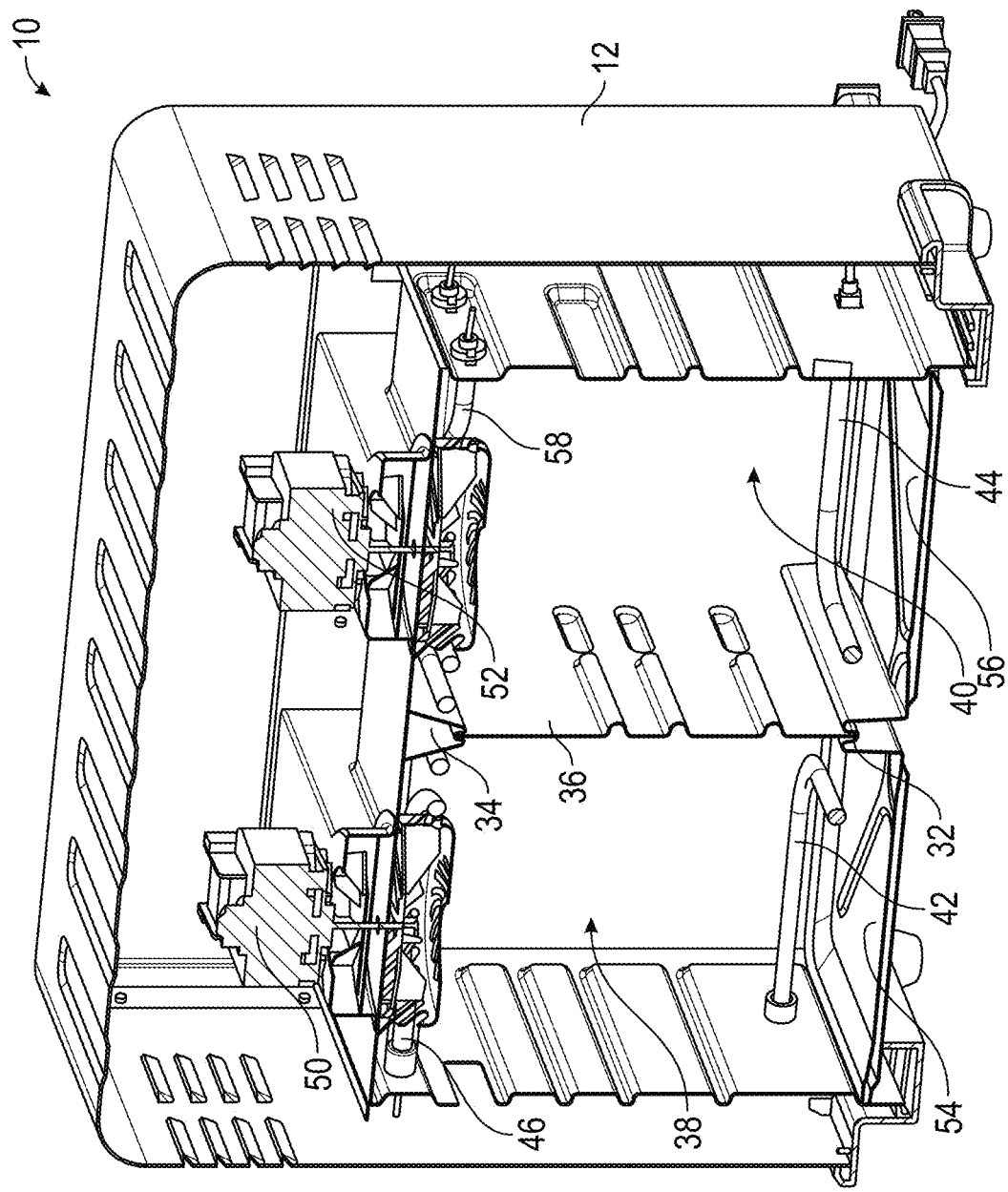
FIG. 8 is a perspective, cross-sectional view of the cooking appliance of FIG. 1.

With reference to FIG. 8, in an embodiment, the cooking apparatus 10 includes a lower slot or guide track 32 at the bottom of the internal compartment 14 and extending from the front of the housing 12 to the rear of the housing 12, and an upper slot or guide track 34 at the top of the internal compartment 14 and extending from the front of the housing 12 to the rear of the housing 12. The lower guide track 32 and upper guide track 34 are aligned in the vertical direction. As further shown in FIG. 8, the cooking apparatus 10 includes a divider 36 that is removably received within the upper and lower guide tracks 32, 34. The divider 36, when received in the upper and lower guide tracks 32, 34, functions to divide the internal compartment 14 into a first (or left side) compartment 38 and a second (or right side) compartment 40. In an embodiment, the width of the first and second compartment 38, 40 generally corresponds to the width of the doors 16, 18. In an embodiment, the cooking appliance 10 may include a sensor or other detection means (not shown) for detecting when the divider 26 is received within the internal compartment 14 and for communicating the same to the controller. In an embodiment, the divider 36 may be thermally insulated.

As best shown in FIG. 8, the internal compartment 14 of the cooking appliance 10 includes first and second lower heating elements 42, 44 associated with the first and second compartments 38, 40, respectively. The internal compartment 14 is also provided with a pair of upper heating elements (heating elements 46, 48 and 58, 60) associated with each of the first and second compartments 38, 40, respectively. In an embodiment, the heating elements 42, 44, 46, 48, 58, 60 may be any type of heating element known in the art such as, for example, Calrod® heating elements (e.g., stainless steel Calrod® heating elements), although any other type of heating element known in the art, such as quartz, infrared, tungsten, halogen, etc., may also be utilized without departing from the broader aspects of the present invention. In an embodiment, each compartment 38, 40 may also include a convection fan assembly 50, 52 mounted within the housing 12 above the left side and right side compartments 38, 40, respectively, for generating convection air to be circulated within the left side and right side compartments. 38, 40. In an embodiment, each convection fan assembly 50, 52 may include a motor and a fan or impeller drivingly connected to the motor.

Figure 9:
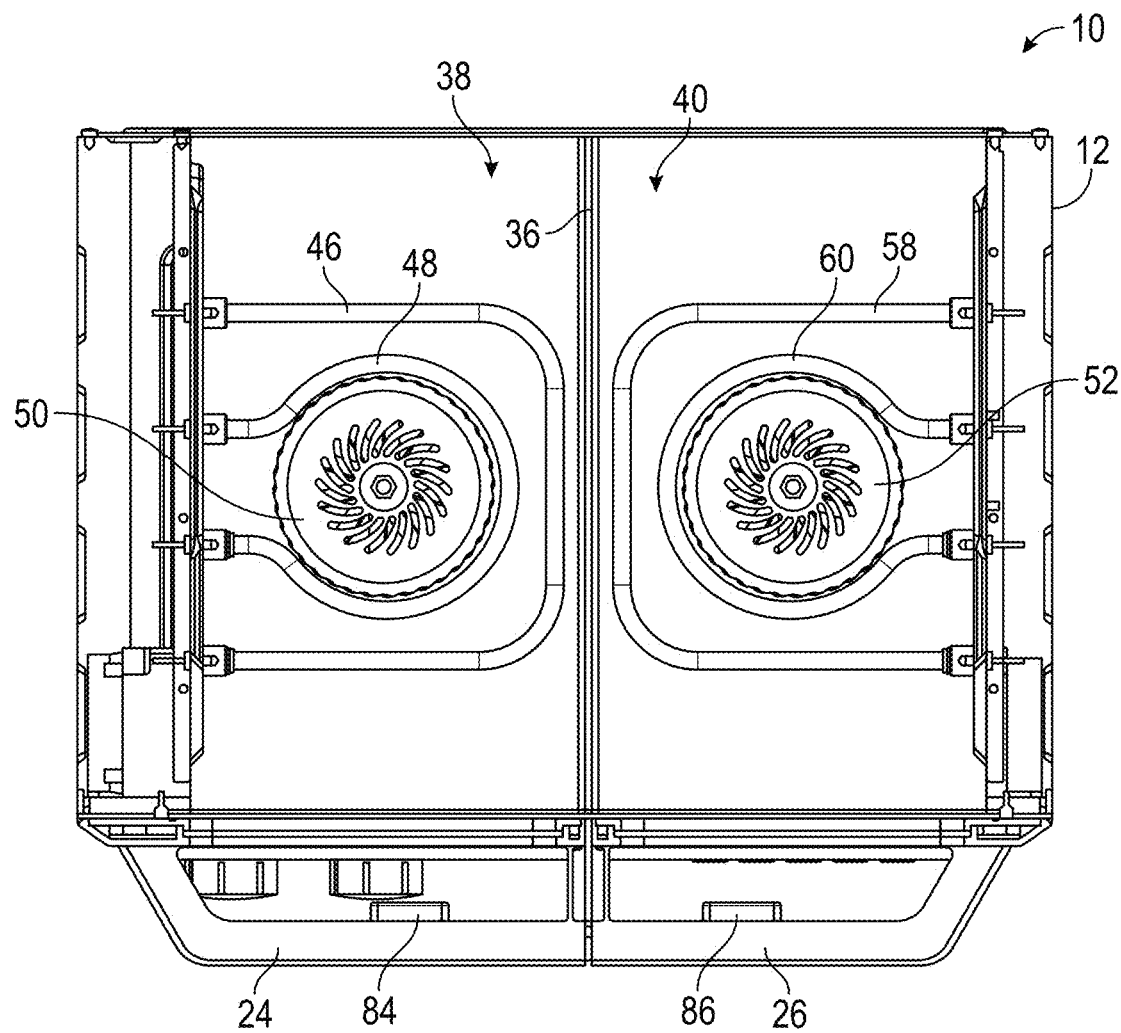
FIG. 9 is a cross-sectional, top view of the cooking appliance of FIG. 1, showing the upper heating elements and convection fan assemblies of the first and second compartments.
Figure 10:
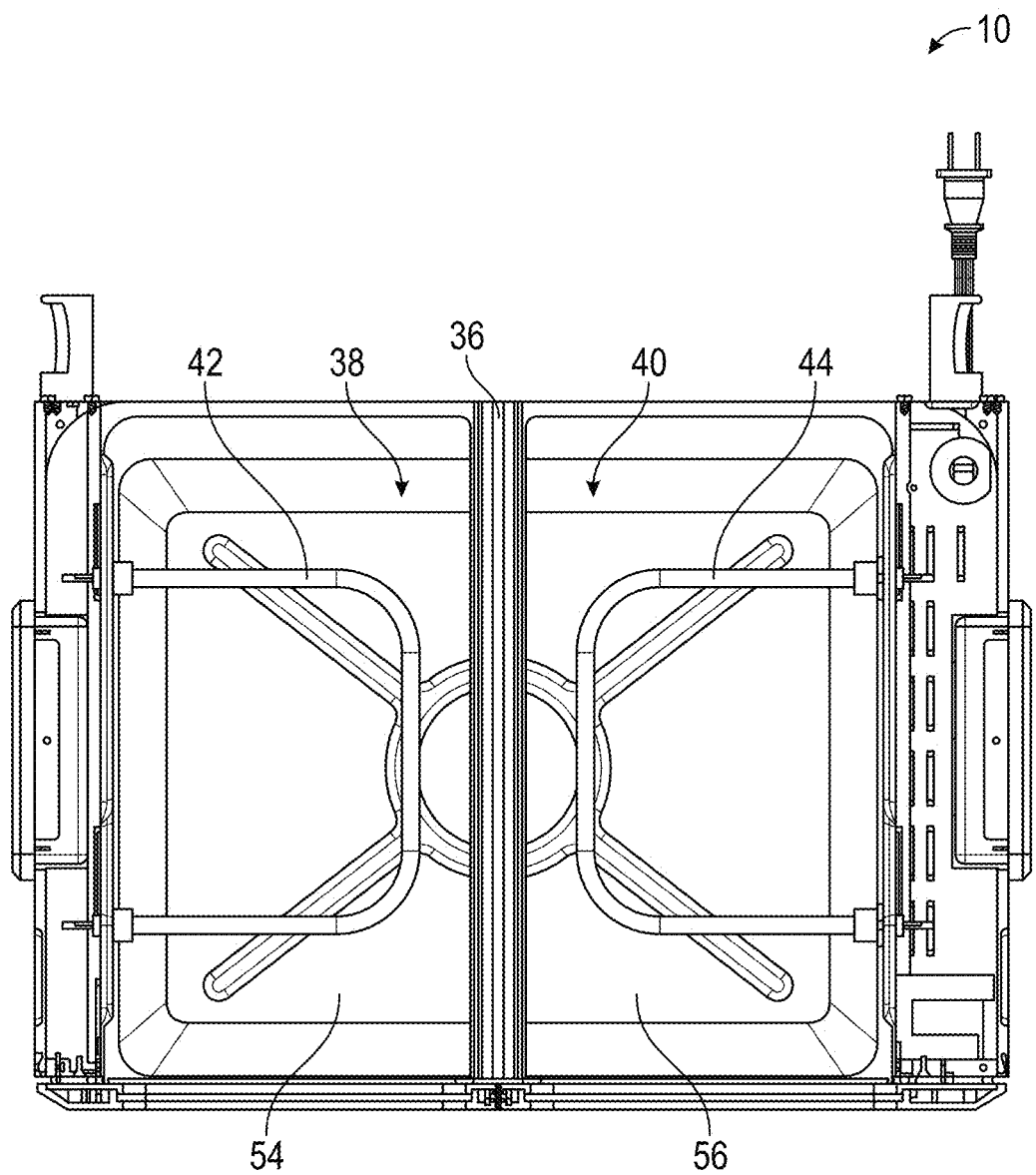
FIG. 10 is a cross-sectional, top view of the cooking appliance of FIG. 1, showing the lower heating elements of the first and second compartments.

In an embodiment, the heating elements 42, 44, 46, 58 are generally rectangular in shape/configuration, while the heating elements 48, 60 are generally circular in shape/configuration and are in close association with air inlets of the convection fan assemblies 50, 52, as best shown in FIG. 9, so that air from the convection fan assemblies 50, 52 entering the first and second compartments 38, 40 passes across the heating element 48, 60 and is heated as it enters the left and right side compartments 38, 40. As further shown in FIG. 8, each compartment 38, 40 may also include a removable crumb tray 54, 56 slidably received within the housing 12 at the bottom of each compartment 38, 40.

In an embodiment, the user interface 30 is electrically connected to, and configured to control, operation of the heating elements 42, 44, 46, 48, 58, 60 and the convection fan assemblies 50, 52. In particular, the user interface 30 includes a microprocessor (not shown) and control circuitry configured to control the heating elements and convection fan assemblies in dependence upon a user input, and according to control algorithms stored in memory. In an embodiment, each of the heating elements 42, 44, 46, 48, 58, 60 are independently controllable by the microprocessor and control circuitry. In another embodiment, the heating elements of the first compartment 38 are controllable independently of the heating elements of the second compartment 40, and vice versa. In yet another embodiment, the entire array of heating elements may be collectively controlled, as a group.

Figure 2:
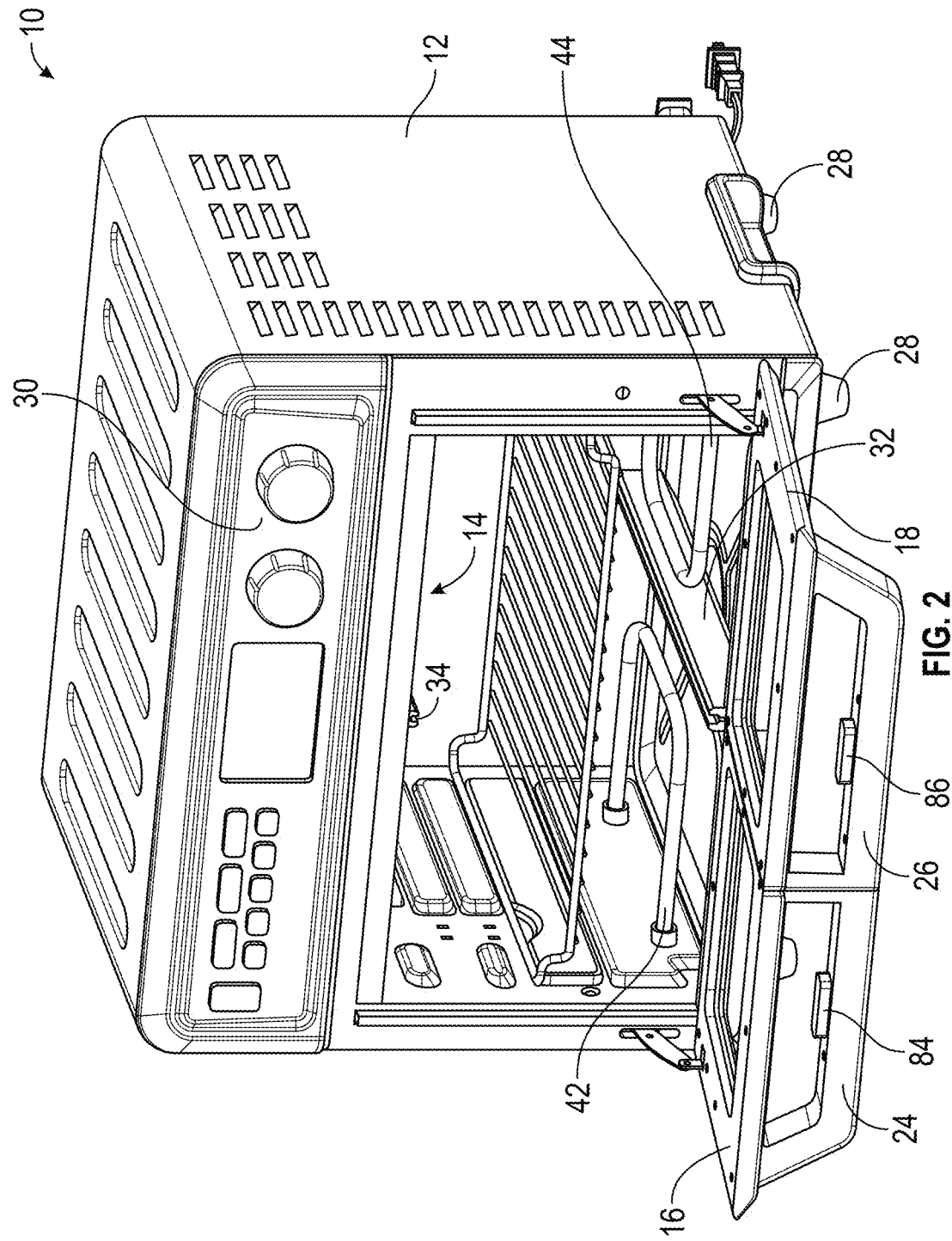
FIG. 2 is another perspective view of the cooking appliance of FIG. 1, showing the appliance in a single compartment configuration with the doors open.
Figure 3:
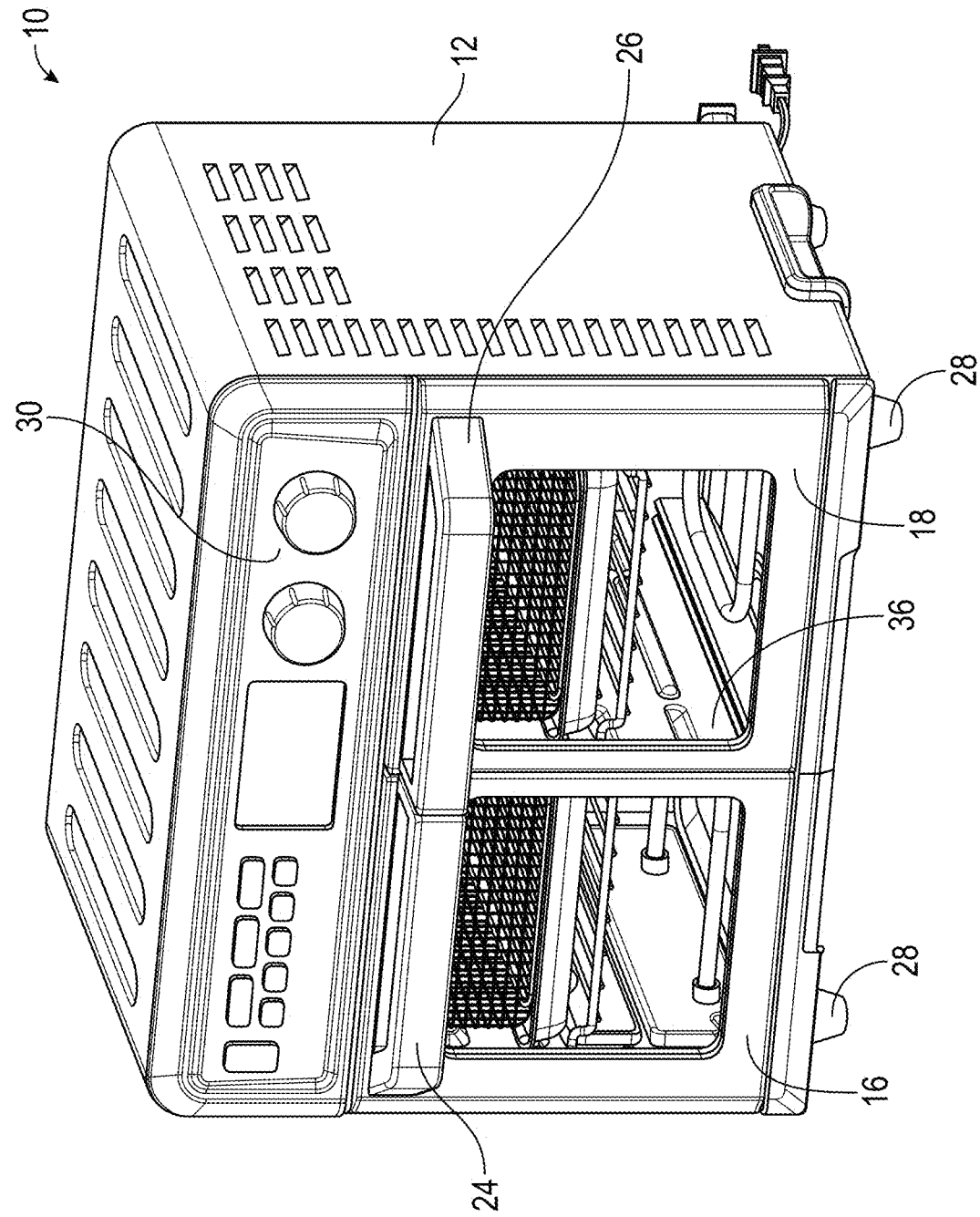
FIG. 3 is another perspective view of the cooking appliance of FIG. 1, showing the appliance in a dual configuration.
Figure 4:
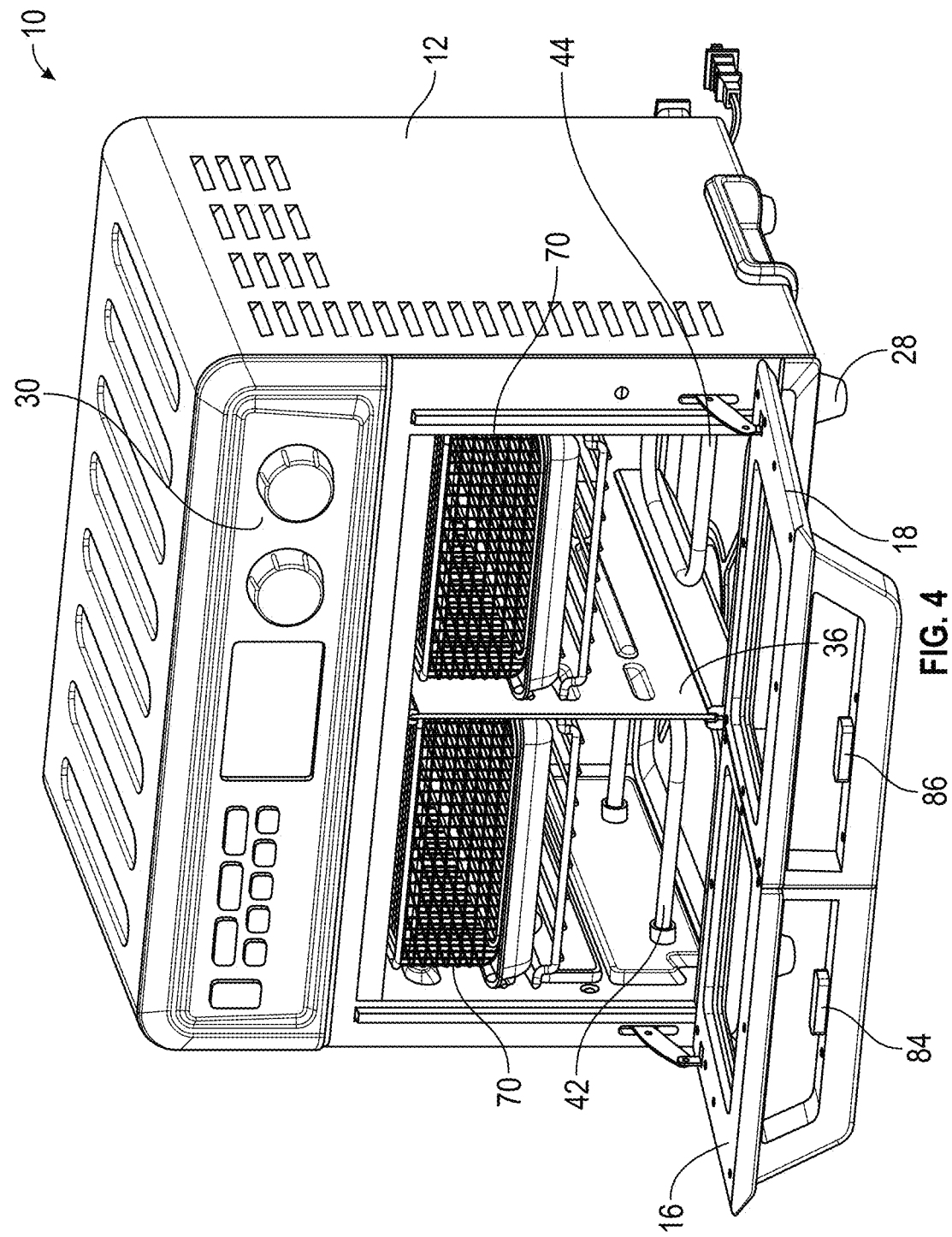
FIG. 4 is another perspective view of the cooking appliance of FIG. 1, showing the appliance in a dual compartment configuration with the doors open.
Figure 11:
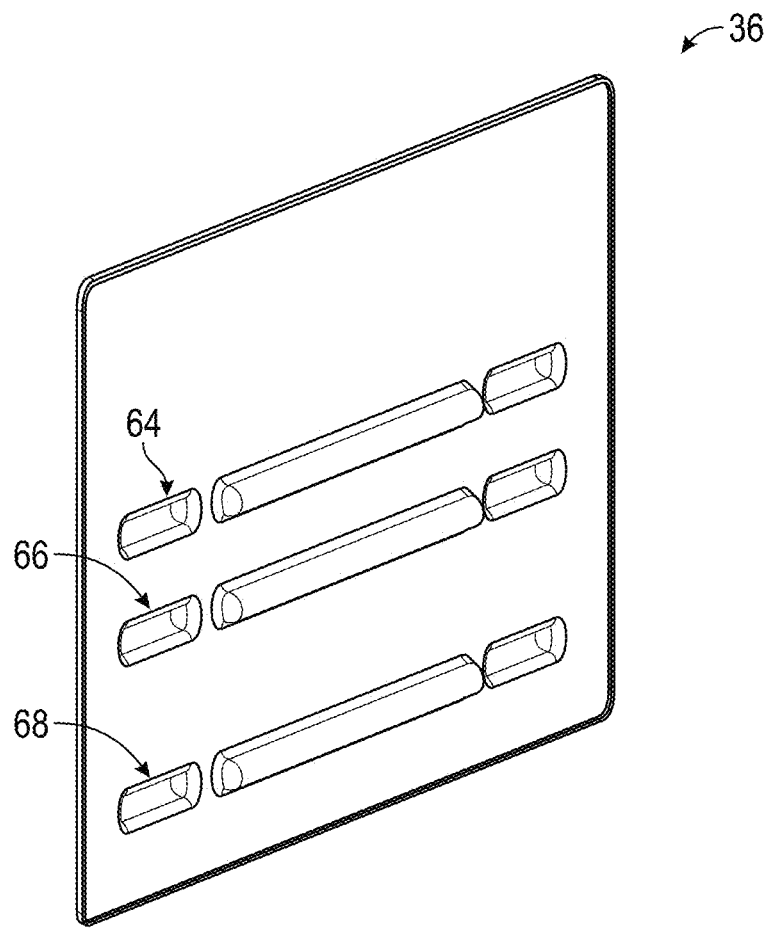
FIG. 11 is a perspective view of a divider of the cooking appliance of FIG. 1.

In an embodiment, the opposing interior sidewalls of the cooking appliance 10 have guide tracks or slots that slidably receive one or more horizontal racks 62 or cooking baskets, as illustrated in FIGS. 1 and 2. Similarly, as shown in FIG. 11, in an embodiment, the opposing sides of the divider 36 are configured with one or more slots, e.g., slots 64, 66, 68 that correspond in spacing from the bottom of the appliance 10 with the slots in the internal sidewalls. These slots enable one or more racks or cooking baskets 70 to be slidably received by, and supported in, the left and right compartments 38, 40, as best shown in FIG. 4.

Referring back to FIGS. 1 and 2, in use, the divider 36 can be removed from the internal compartment 14 to provide a single large oven cavity/compartment. In this mode of operation, all of the heating elements and/or the convection fan assemblies can be controlled and operated collectively, to carry out one or more pre-programmed or manually selected/programmed cooking modes. It is not intended, however, that the invention be so limited in this regard. In particular, it is contemplated that even when the divider 36 is not present, the heating elements and convection fan assemblies can be controlled independently to provide a variety of cooking functions. For example, one or more of the heating elements associated with the left compartment 38 can be operated at a different temperature, different duration or different mode of operation (e.g., broiling mode) than one or more of the heating elements associated with the right compartment 40, to provide different cooking zones or cooking functions within the same oven cavity. By way of example, one side of the oven may be operated in a broiling mode of operation, while the other side of the oven may be operated in a baking mode of operation.

With reference to FIGS. 3-7, the divider 36 may be inserted into the lower and upper guide tracks 32, 34 to divide the interior compartment 14 into left and right compartments 38, 40. In the inserted position, the divider 36 may be detected by the sensor or other detection means. The left and right compartments 38, 40 can then be operated as effectively separate ovens to carry out one or more pre-programmed or manually selected/programmed cooking modes. In particular, in this configuration, the heating elements 42, 46, 48 and convection fan assembly 50 of the left compartment 38 may be operated independently of the heating elements 44, 58, 60 and convection fan assembly 52 of the right heating compartment 40. The left and right compartments 38, 40, therefore, can be utilized to carry out two different cooking modes or cooking functions simultaneously (e.g., baking and broiling; broiling and convection cooking/air frying; baking at a first temperature in one compartment, and baking at a second, different temperature, in the other compartment).

Figure 12:
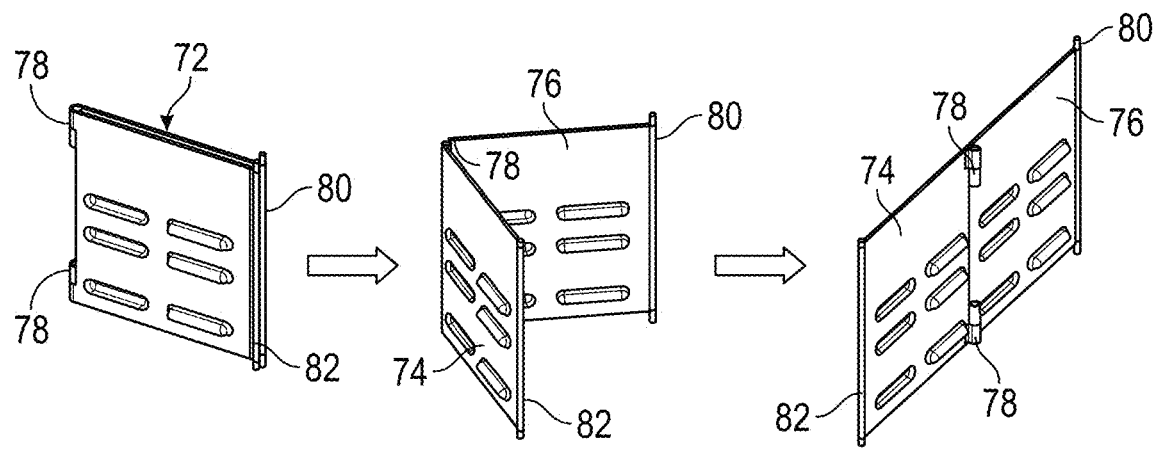
FIG. 12 is a perspective view of an alternative divider for use with the cooking appliance of FIG. 1.

Referring now to FIG. 12, an alternative divider 72 for use with the cooking appliance 10 is illustrated. Rather than being a single, flat body, the divider 72 includes a first body portion 74 and a second body portion 76 connected to the first body portion at a hinge 78. The divider 72 also includes a first hinge 82 or rod mounted adjacent to the free edge of the first body portion 74 and a second hinge 80 or rod mounted adjacent to the free edge of the second body portion 76. As illustrated in FIG. 12, the divider 72 is thus foldable about the central hinge 78.

Figure 13:
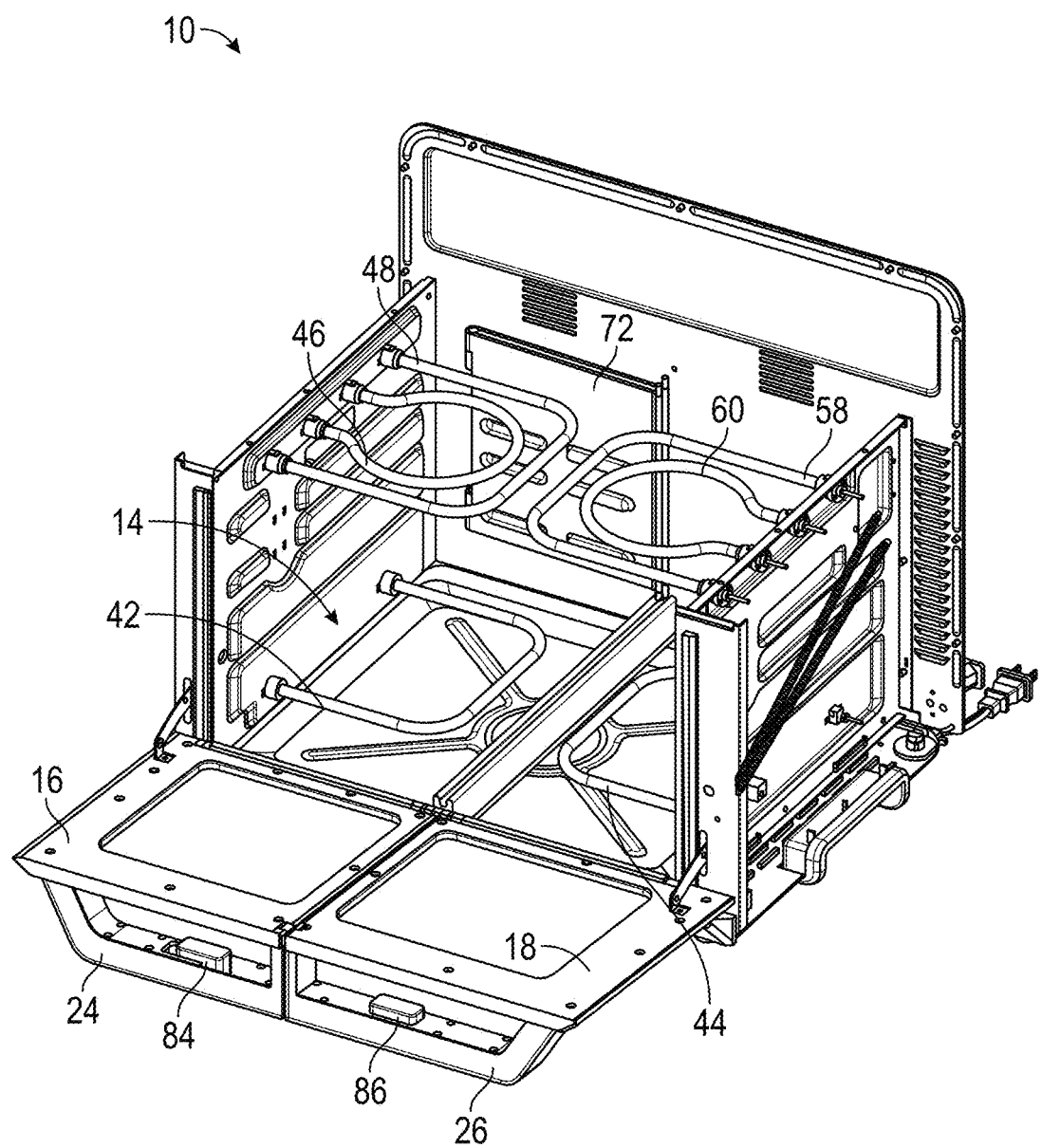
FIG. 13 is a perspective view of a portion of the cooking appliance of FIG. 1, showing the alternative divider of FIG. 12 in a stowed position.
Figure 14:
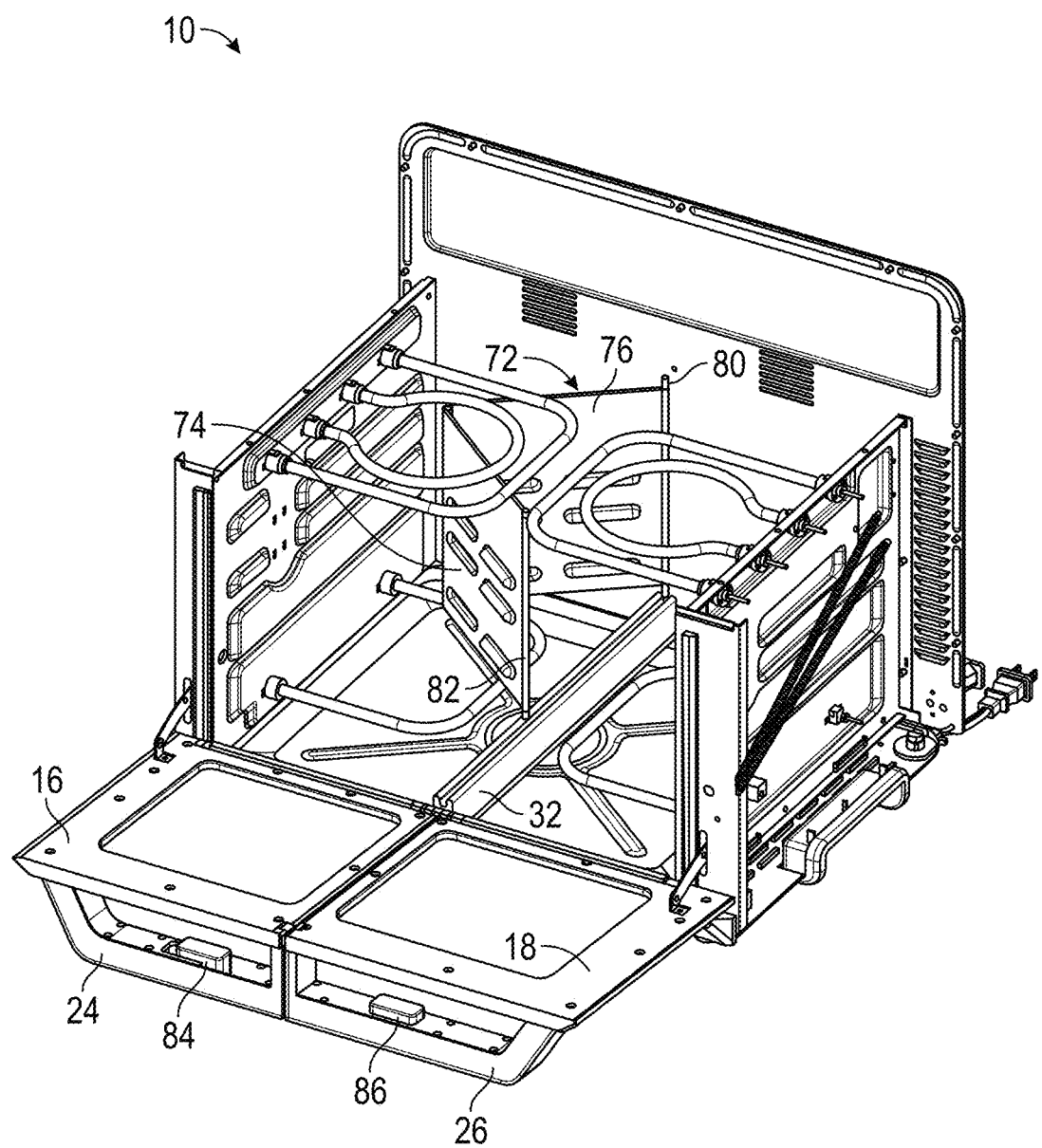
FIG. 14 is a perspective view of a portion of the cooking appliance of FIG. 1, showing the alternative divider of FIG. 12 being moved to an extended position.
Figure 15:
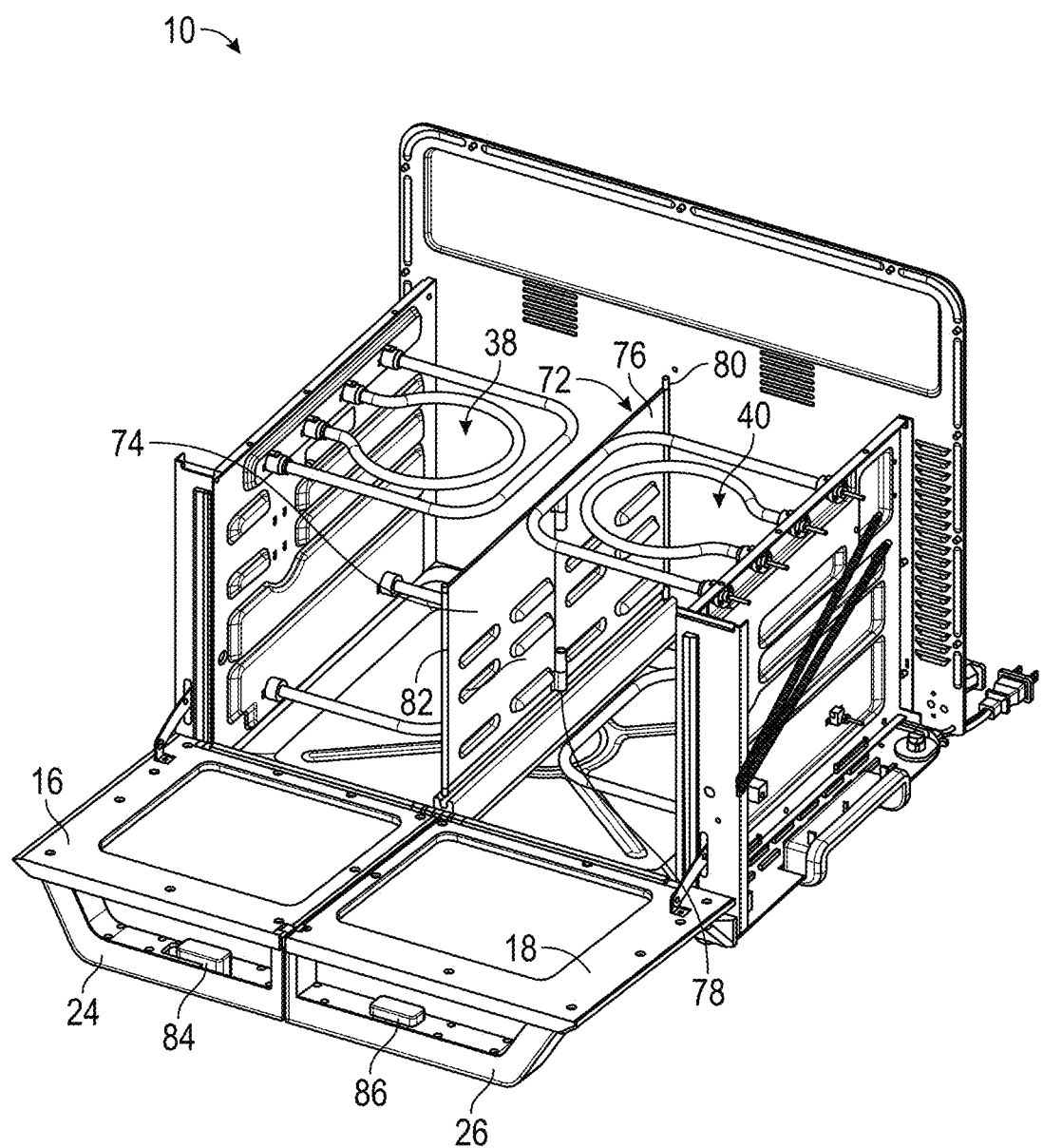
FIG. 15 is a perspective view of a portion of the cooking appliance of FIG. 1, showing the alternative divider of FIG. 12 in an extended position forming dual compartments.
Figure 16:
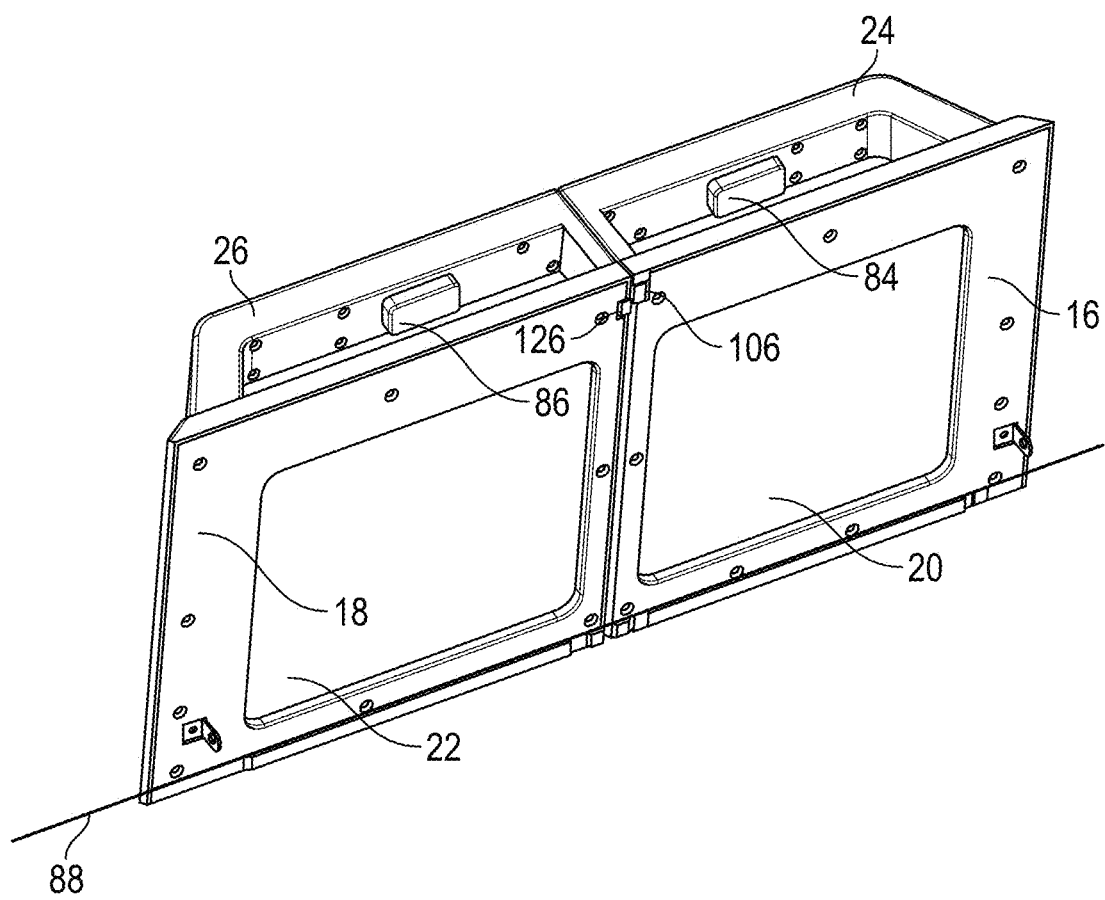
FIG. 16 is a rear, perspective view of the doors of the cooking appliance of FIG. 1, showing the doors in engagement with one another.
Figure 17:
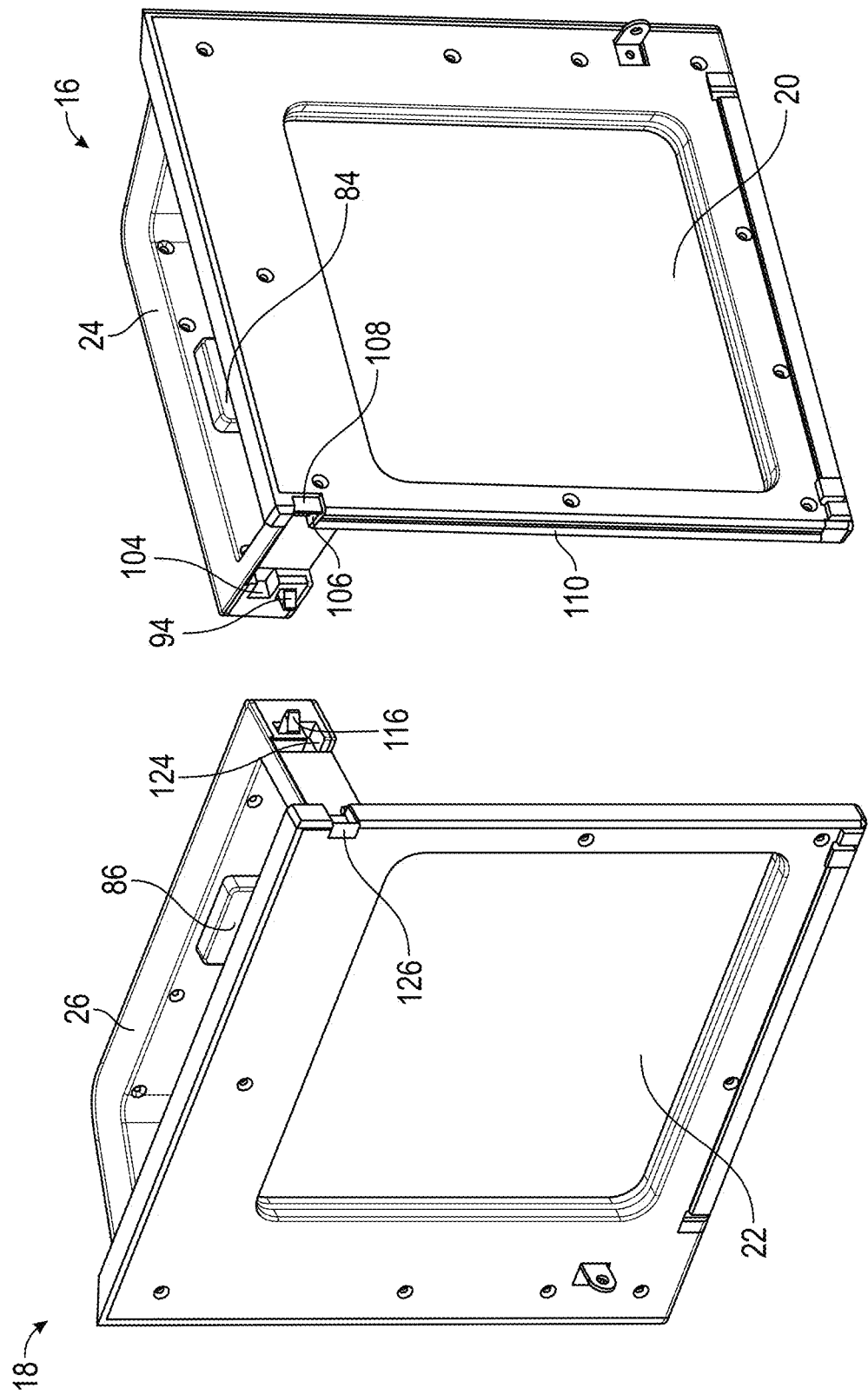
FIG. 17 is rear, perspective view of the doors of the cooking appliance of FIG. 1.
Figure 18:
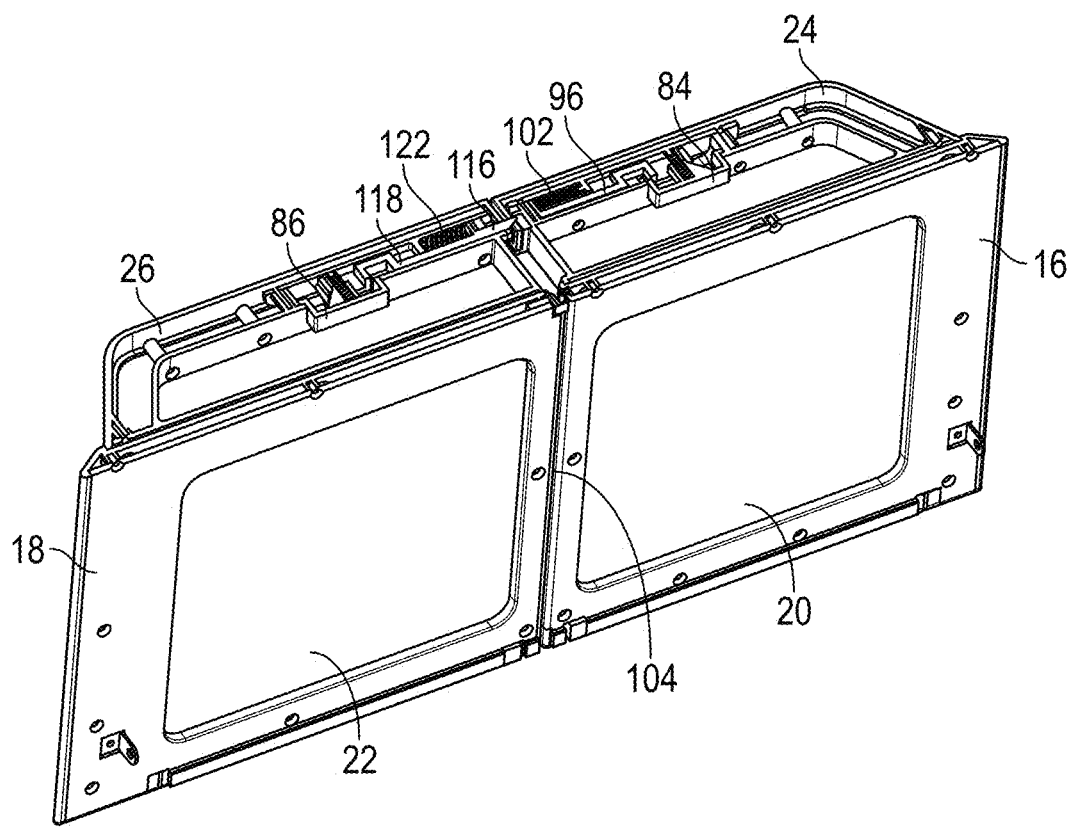
FIG. 18 is another rear, perspective view of the doors of the cooking appliance of FIG. 1, showing internal components of the handles.

Operation of the alternative divider 72 will now be disclosed with reference to FIGS. 13-15. As shown therein, the second hinge or rod 80 of the second body portion 76 is mounted in fixed position at the rear end of the upper and lower slots 34, 32. Opposed, distal ends of the first rod 82 are slidably received within the upper and lower slots 34, 32, respectively. As shown in FIG. 13, the divider 72 can be folded and moved to a position where it rests flat against the rear wall of the internal compartment 14. In this stowed position, the cooking appliance 10 can be operated as a single, large oven. With specific reference to FIG. 14, when operation using dual compartments is desired, the leading edge of the first body portion 74 can be grasped and pull forward; this movement causes the first rod 82 to slide forward within the slots 32, 34, unfolding the divider 72 to the position shown in FIG. 15. Opposing upper and lower apertures (not shown), may retain the divider 72 in its extended/deployed position. In an embodiment, the rods 80, 82 may be spring biased so that the rod can be shortened against the spring bias, enabling the divider 72 to be removed from the compartment 14 for cleaning or the like.

Referring now to FIGS. 16-23, the configuration and mechanism of operation of the doors 16, 18 of the cooking appliance 10 are illustrated. As shown therein, the handles 24, 26 of each door 16, 18 include a respective release button 84, 86. In an embodiment, the release buttons 84, 86 are located on the rear surface of the handles 24, 26, although it is also envisioned that the release buttons 84, 86 may be located on the forward facing surface of the handles 24, 26. As described above, the doors 16, 18 are pivotally connected to the housing 12 of the cooking appliance 10 so as to be rotatable about axis of rotation 88, shown in FIG. 16.

Figure 19:
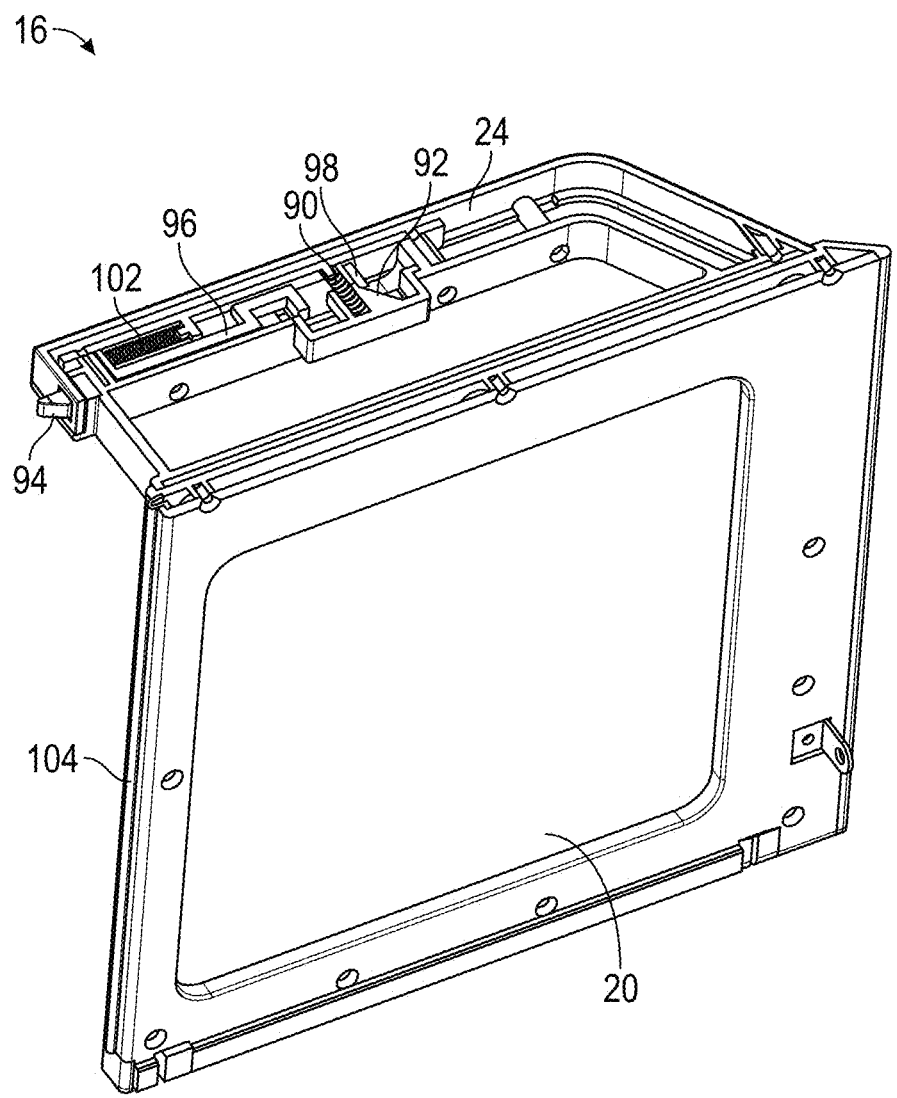
FIG. 19 is a perspective view of a left side door of the cooking appliance of FIG. 1, showing a locking bolt thereof in an extended position.
Figure 20:
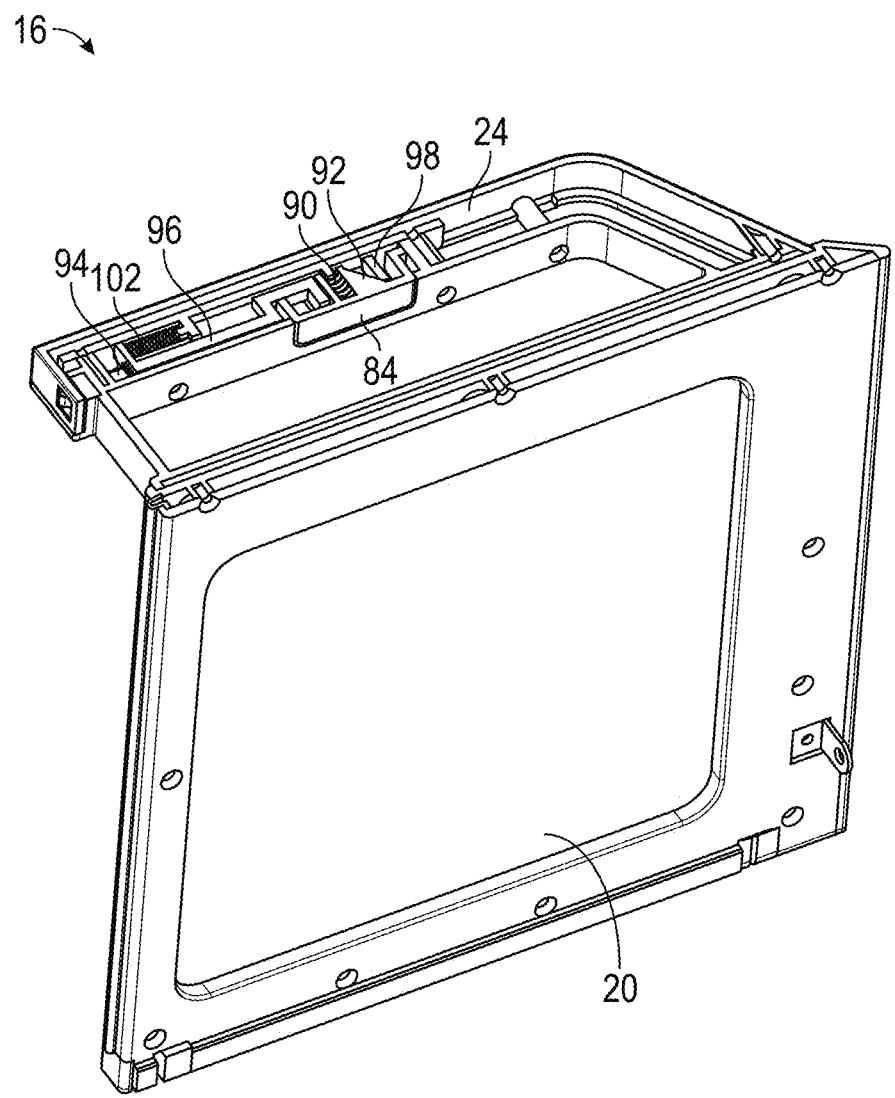
FIG. 20 is a perspective view of a left side door of the cooking appliance of FIG. 1, showing a locking bolt thereof in a retracted position.

As best shown in FIGS. 19 and 20, the button 84 of the left door 16 includes a first compression spring 90 internal to the button 84 that biases the button 84 to its extended position (shown in FIG. 19), and an internal inclined surface 92, the purpose of which will be described hereinafter. A first spring bolt 94 extends laterally outward from the handle 24 through an opening therein, towards the right door 18, and is connected to a linkage assembly 96 that extends internally within the handle towards the button 84. The linkage assembly 96 includes a projection 98 that interfaces with the inclined surface 92 of the button. As shown therein, a second compression spring 102 is mounted within the handle 24 and interfaces with the linkage assembly 96 in the manner described hereinafter.

In operation, the first compression spring 90 biases the button 84 to its extended position, while the second compression spring 102 biases the linkage assembly 96, and thus the first spring bolt 94 to its extended position where a distal end of the spring bolt 94 extends from the handle 24 towards the second door 18, as best shown in FIG. 19. As best shown in FIG. 20, when the button 84 is depressed against the bias of the first compression spring 90, the inclined surface 92 acts on the projection 98 of the linkage assembly 96, driving the projection 98 and linkage assembly 96 to the right as the projection 98 travels along the inclined surface 92, against the bias of the second compression spring 102. This movement of the linkages assembly 96 causes a corresponding movement of the first spring bolt 94, causing it to retract into the handle 24, as shown in FIG. 20. Upon release of the button 84, the first compression spring 90 biases the button 84 to its extended position, while the second compression spring 102 biases the first spring bolt 94 to its extended position.

Referring back to FIG. 17, the left door 16 further includes a shoulder 104 forming a stop, located above the first spring bolt 94, and a notch 106 in the door 16 in alignment with the shoulder 104, the purposes of which will be described hereinafter. A silicone flap 108 is positioned at a rear of the notch 106. The door 16 further includes a sealing element 110 that forms a seal with the second door 18 when the doors 16, 18 are in the closed position.

Figure 21:
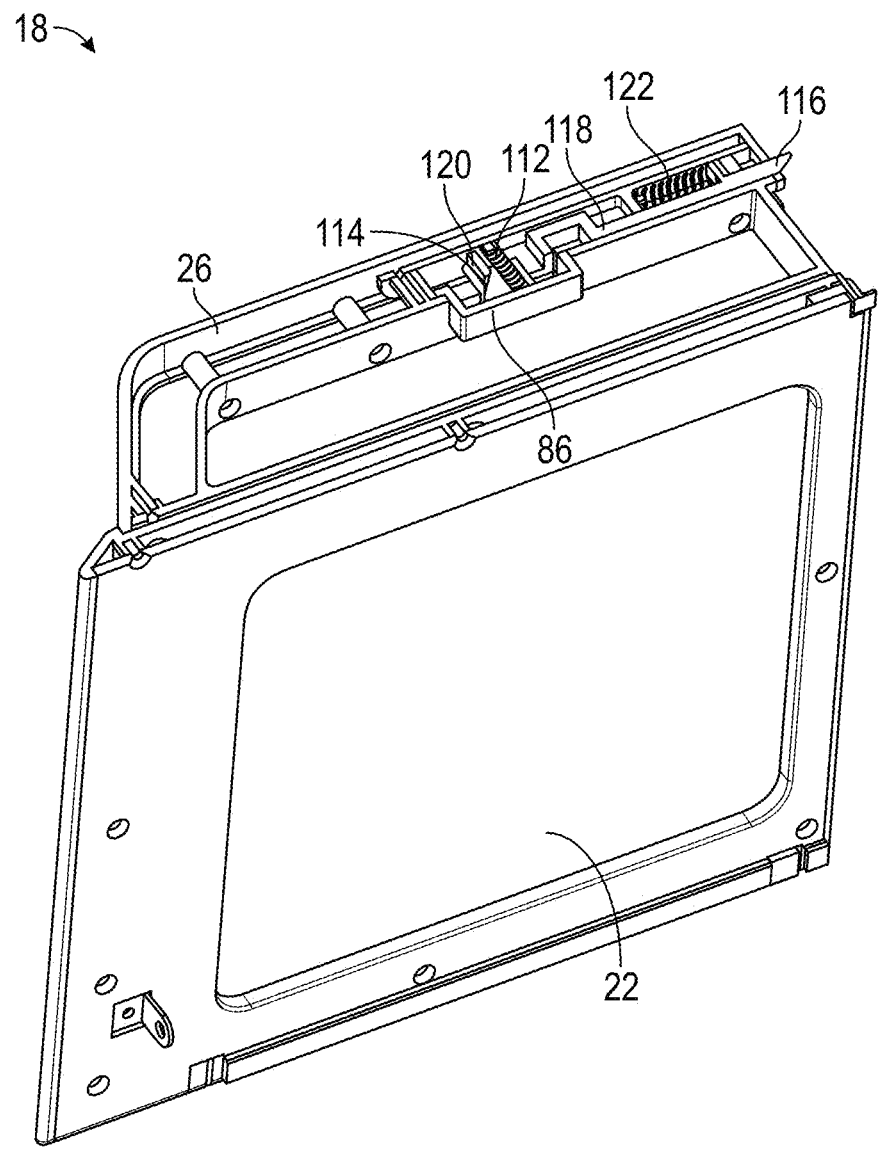
FIG. 21 is a perspective view of a right side door of the cooking appliance of FIG. 1, showing a locking bolt thereof in an extended position.
Figure 22:
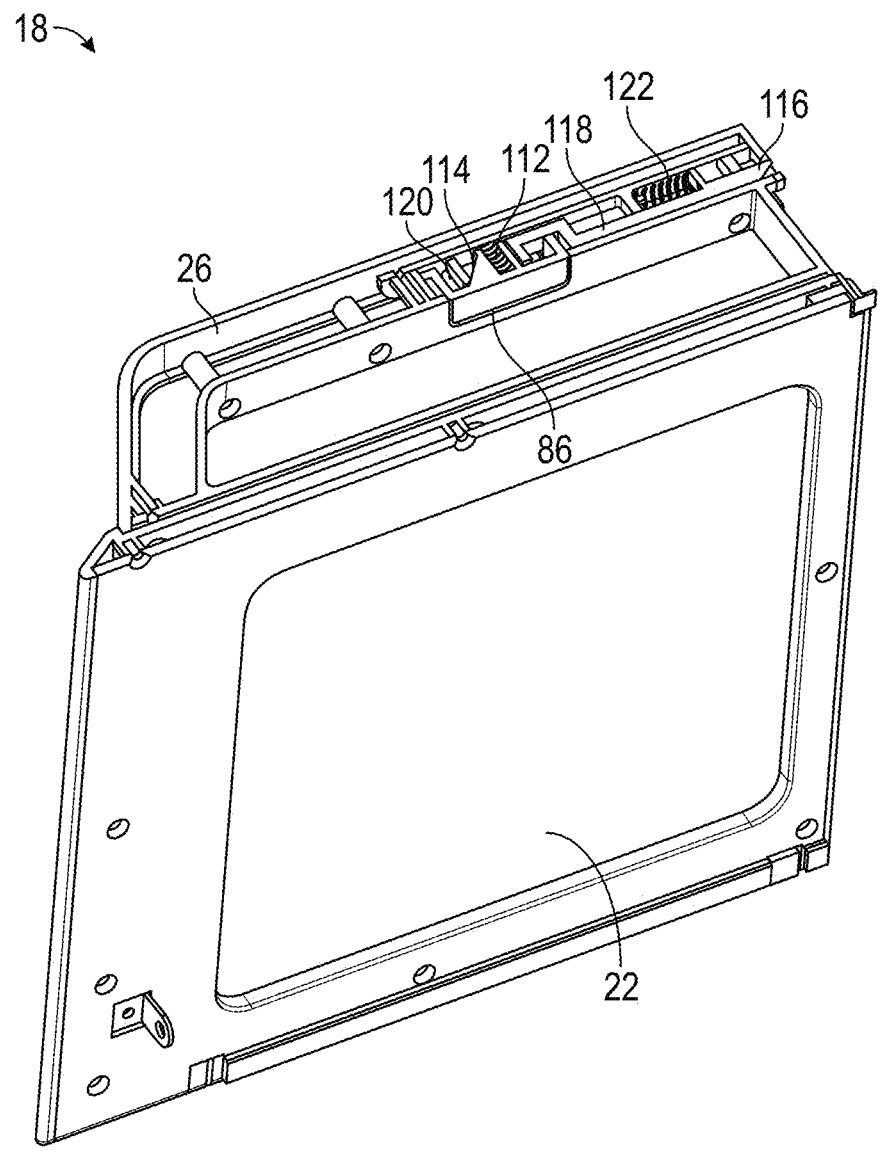
FIG. 22 is a perspective view of a right side door of the cooking appliance of FIG. 1, showing a locking bolt thereof in a retracted position.

The configuration and mechanism of operation of the right door 18 is similar to that of the left door 16. As best shown in FIGS. 21 and 22, the button 86 of the right door 18 includes a first compression spring 112 internal to the button 86 that biases the button 86 to its extended position (shown in FIG. 21), and an internal inclined surface 114. A second spring bolt 116 extends laterally outward from the handle 26 through an opening therein, towards the left door 16, and is connected to a linkage assembly 118 that extends internally within the handle towards the button 86. The linkage assembly 118 includes a projection 120 that interfaces with the inclined surface 114 of the button 86. As shown therein, a second compression spring 122 is mounted within the handle 26 and interfaces with the linkage assembly 118 in the manner described hereinafter.

In operation, the first compression spring 112 biases the button 86 to its extended position, while the second compression spring 122 biases the linkage assembly 118, and thus the first spring bolt 116 to its extended position where a distal end of the spring bolt 116 extends from the handle 26 towards the first door 16, as best shown in FIG. 21. As best shown in FIG. 22, when the button 86 is depressed against the bias of the first compression spring 112, the inclined surface 114 acts on the projection 120 of the linkage assembly 118, driving the projection 120 and linkage assembly 118 to the left as the projection 120 travels along the inclined surface 114, against the bias of the second compression spring 122. This movement of the linkages assembly 118 causes a corresponding movement of the second spring bolt 116, causing it to retract into the handle 26, as shown in FIG. 22. Upon release of the button 86, the first compression spring 112 biases the button 86 to its extended position, while the second compression spring 122 biases the second spring bolt 116 to its extended position.

Referring once again to FIG. 17, the right door 18 similarly includes a shoulder 124 forming a stop, located below the second spring bolt 116, and a notch 126 in the door 18 in alignment with the shoulder 124, the purposes of which will be described hereinafter.

Figure 23:
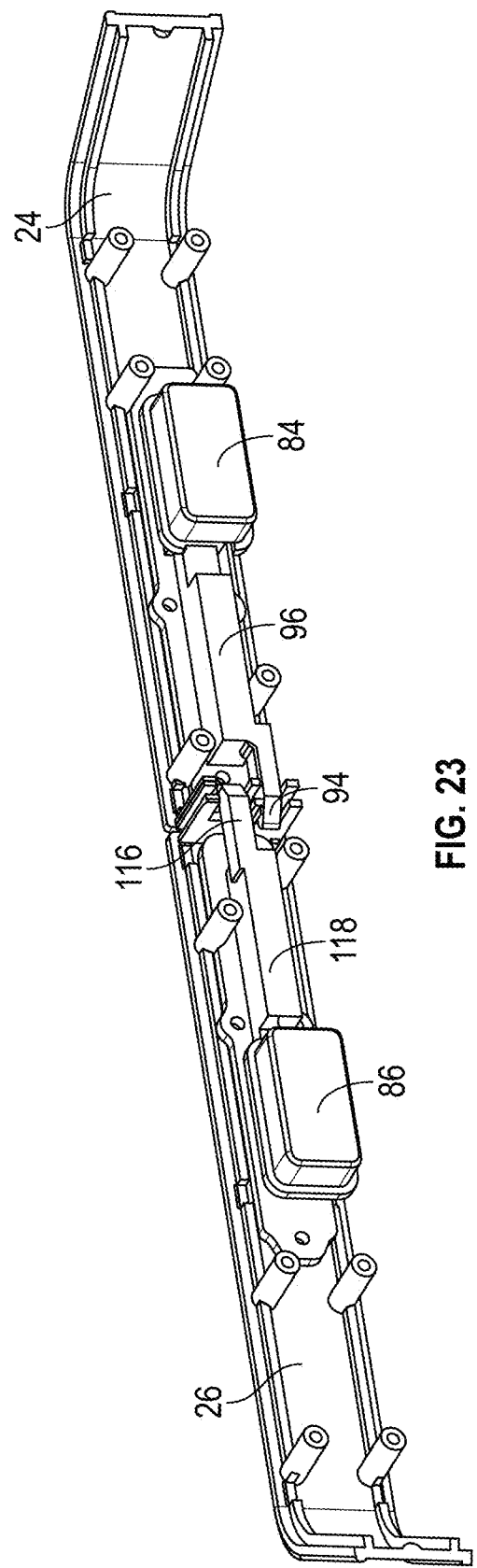
FIG. 23 is a perspective view of the door handles of the cooking appliance of FIG. 1, showing internal components of the handles.

Turning now to FIG. 23, the interface between the left handle 24 and right handle 26 is shown. As illustrated, the first spring bolt 94 of the handle 24 is received against the shoulder 124 of the handle 26 of the right door 18, while the second spring bolt 116 of the handle 26 us received against the shoulder 104 of the handle 24 of the left door 16 (when the doors 16, 18 are in their closed position and the buttons 84, 86 are not depressed.

In use, when it is desired to open both doors 16, 18 simultaneously, a user may grasp either or both of the handles 24, 26 and pull to rotate the doors 16, 18 about the axis 88 (without depressing either button 84, 86). This is possible due to the inter-engagement of the spring bolts 94, 116 with the shoulder 104, 124 of the opposing door 16, 18. For example, grasping and pulling on the handle 24 of door 16 without depressing the button 84 causes the door 16 to rotate open about axis 88. This rotational movement also causes the first spring bolt 94 to engage the shoulder 124 of the door 18, and exert an opening force on the shoulder 124, causing the door 18 to also move to the open position via rotation about axis 88. Similarly, grasping and pulling on the handle 26 of door 18 without depressing the button 86 causes the door 18 to rotate open about axis 88. This rotational movement also causes the second spring bolt 116 to engage the shoulder 104 of the door 16, and exert an opening force on the shoulder 104, causing the door 16 to also move to the open position via rotation about axis 88. This is also shown in FIGS. 2 and 4.

Figure 5:
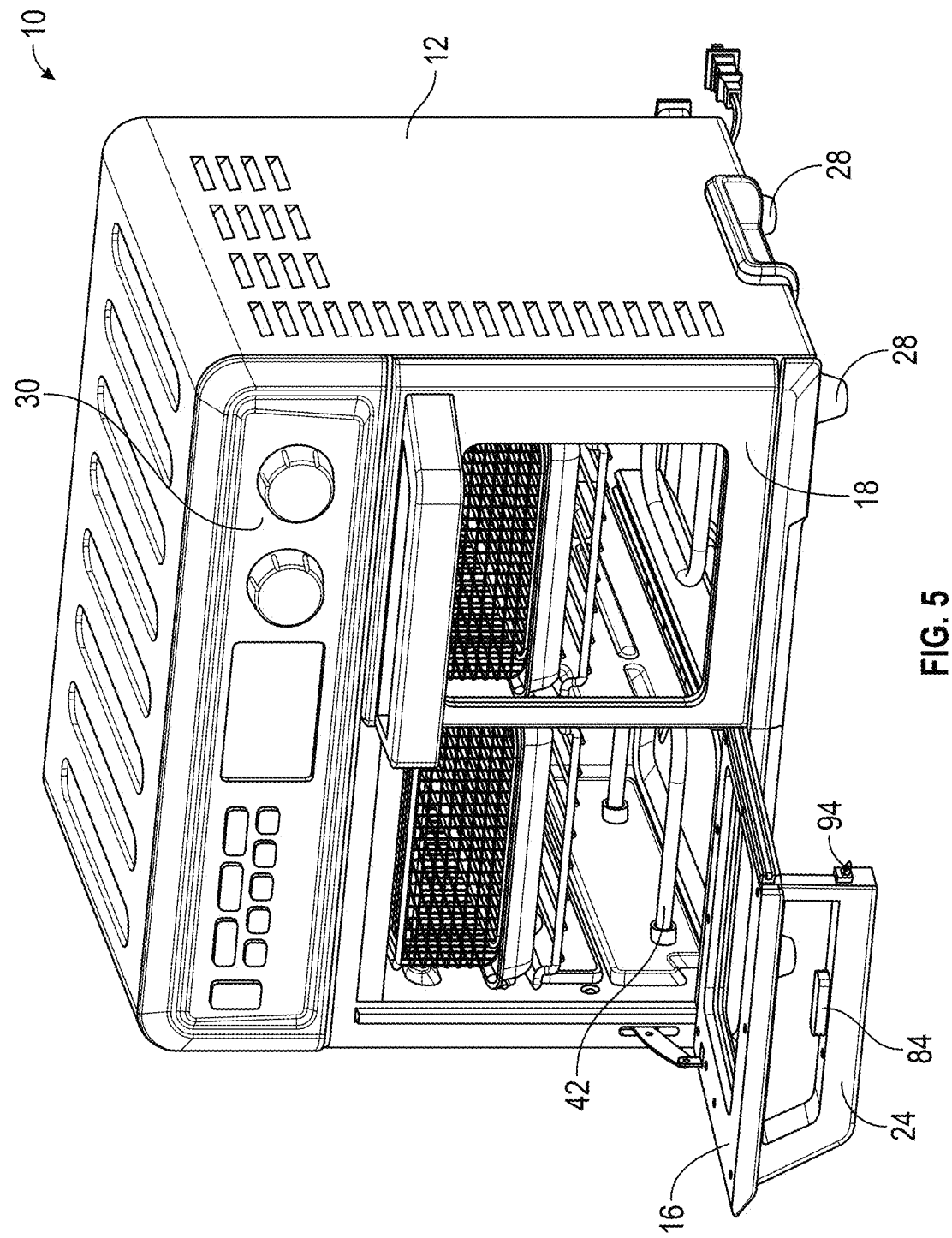
FIG. 5 is another perspective view of the cooking appliance of FIG. 1, showing the appliance in a dual compartment configuration with the left door open.

Importantly, the cooking appliance 10 is also configured so that the doors 16, 18 may be operated individually, such as when access to only one of the cavities/compartments 38, 40 is desired (such as when operating in a dual cavity configuration). For example, when it is desired to open only the left door 16, a user grasps the handle 24 and depresses the button 84 against the bias of the compression spring 102. This causes the first spring bolt 94 to retract within the handle 24 (and out of engagement with the shoulder 124 of the door 18. In this retracted position, the door 16 is free to rotate to its open position about axis 88 (as the first spring bolt 94 no longer contacts shoulder 124). Notch 106 in the door 16 also allows the door 16 to clear the second spring bolt 116 of the door 18, as the door 16 is rotated open. This is shown in FIG. 5. Importantly, the rear-facing surface of the first spring bolt 94 is angled so that the door 16 may be moved fully to the closed position without depressing the button 84 (and with the first spring bolt 94 in the extended position).

Figure 6:
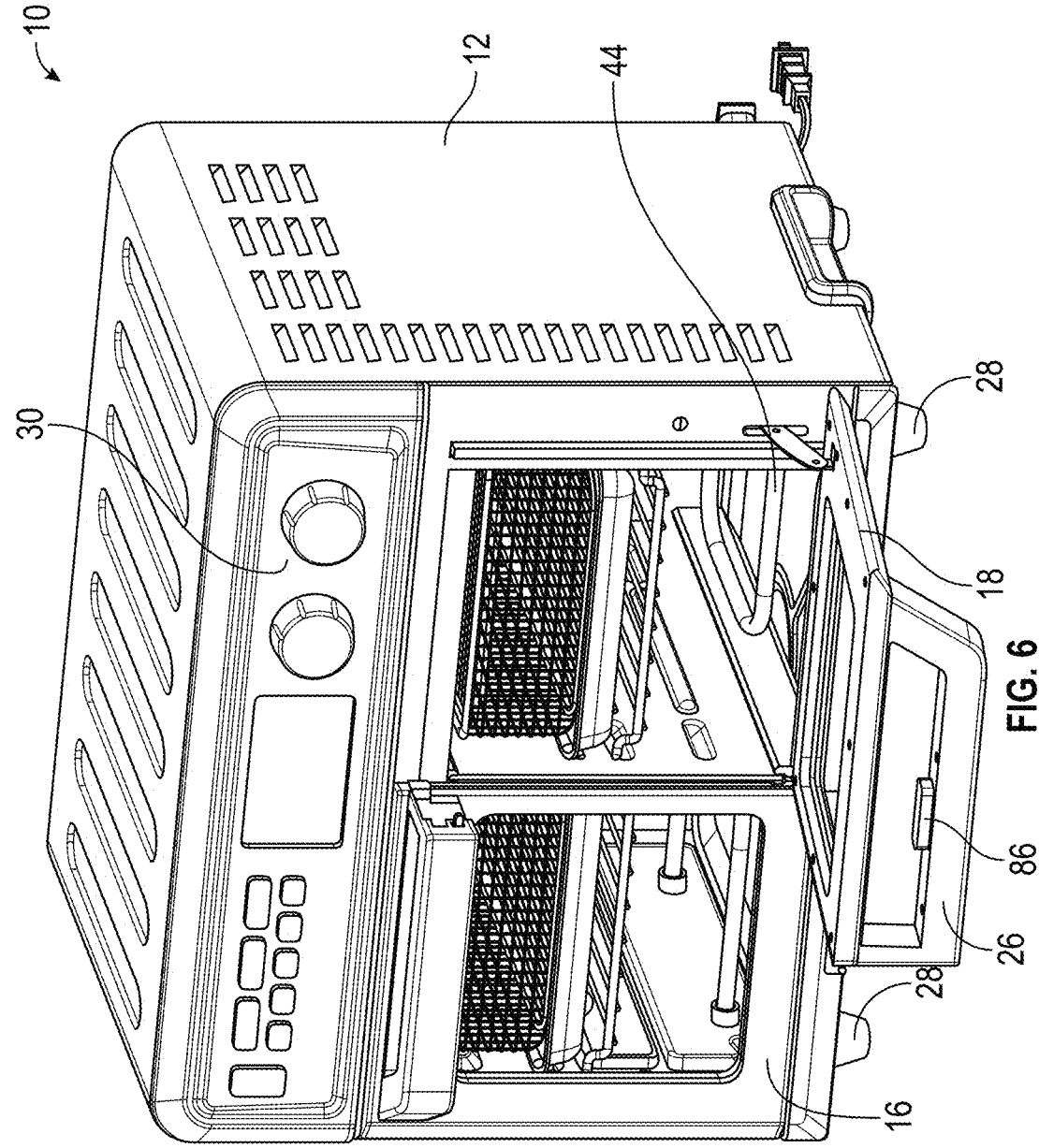
FIG. 6 is another perspective view of the cooking appliance of FIG. 1, showing the appliance in a dual compartment configuration with the right door open.
Figure 7:
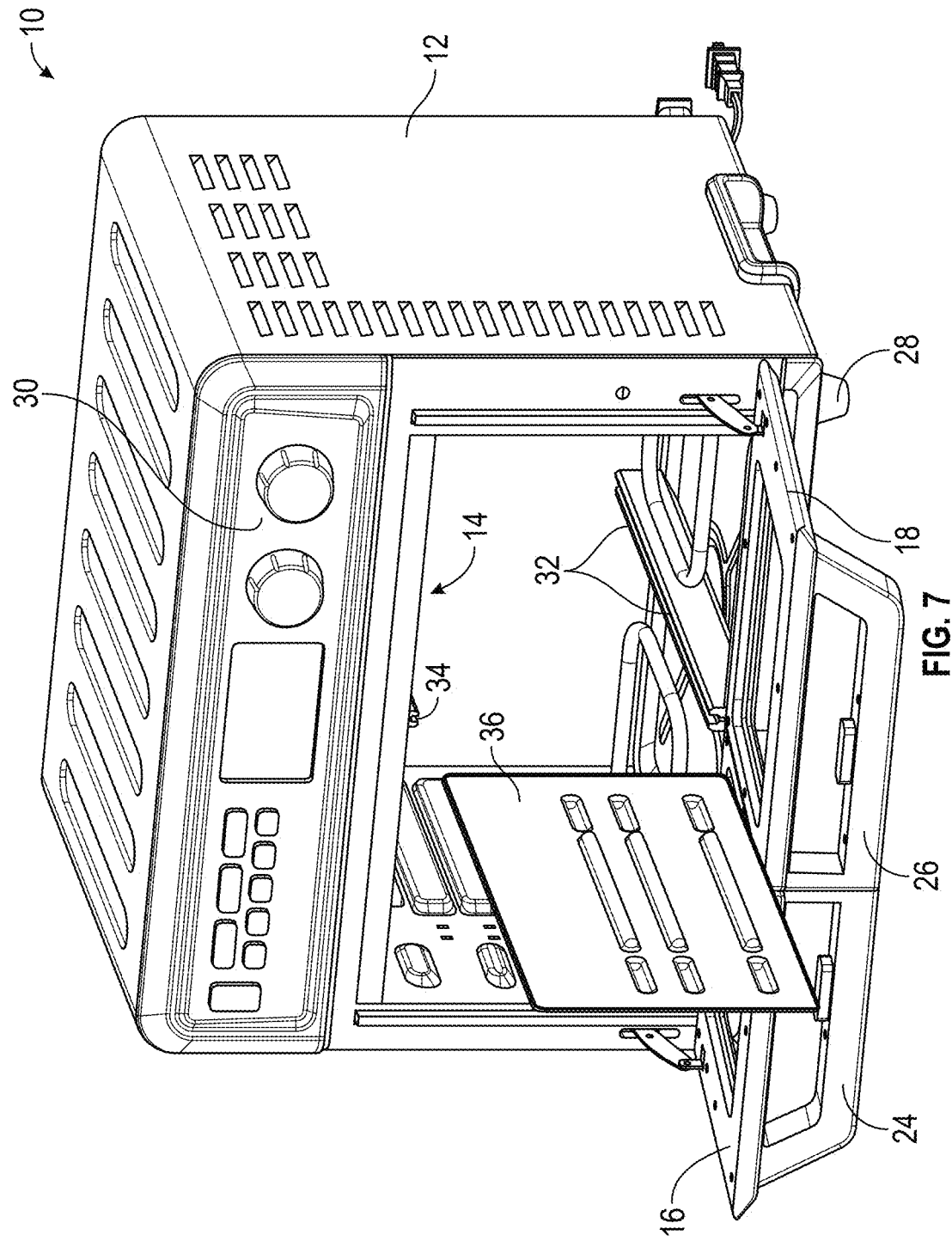
FIG. 7 is a perspective view of the cooking appliance of FIG. 1, showing insertion of a divider into the internal compartment to create two discrete compartments.

Similarly, when it is desired to open only the right door 18, a user grasps the handle 26 and depresses the button 86 against the bias of the compression spring 122. This causes the second spring bolt 116 to retract within the handle 26 (and out of engagement with the shoulder 104 of the door 16. In this retracted position, the door 18 is free to rotate to its open position about axis 88 (as the second spring bolt 116 no longer contacts shoulder 104). Notch 126 in the door 18 also allows the door 18 to clear the first spring bolt 94 of the door 16, as the door 18 is rotated open. This is shown in FIG. 6. Importantly, the rear-facing surface of the second spring bolt 116 is angled so that the door 18 may, likewise, be moved fully to the closed position without depressing the button 86 (and with the second spring bolt 116 in the extended position).

Figure 24:
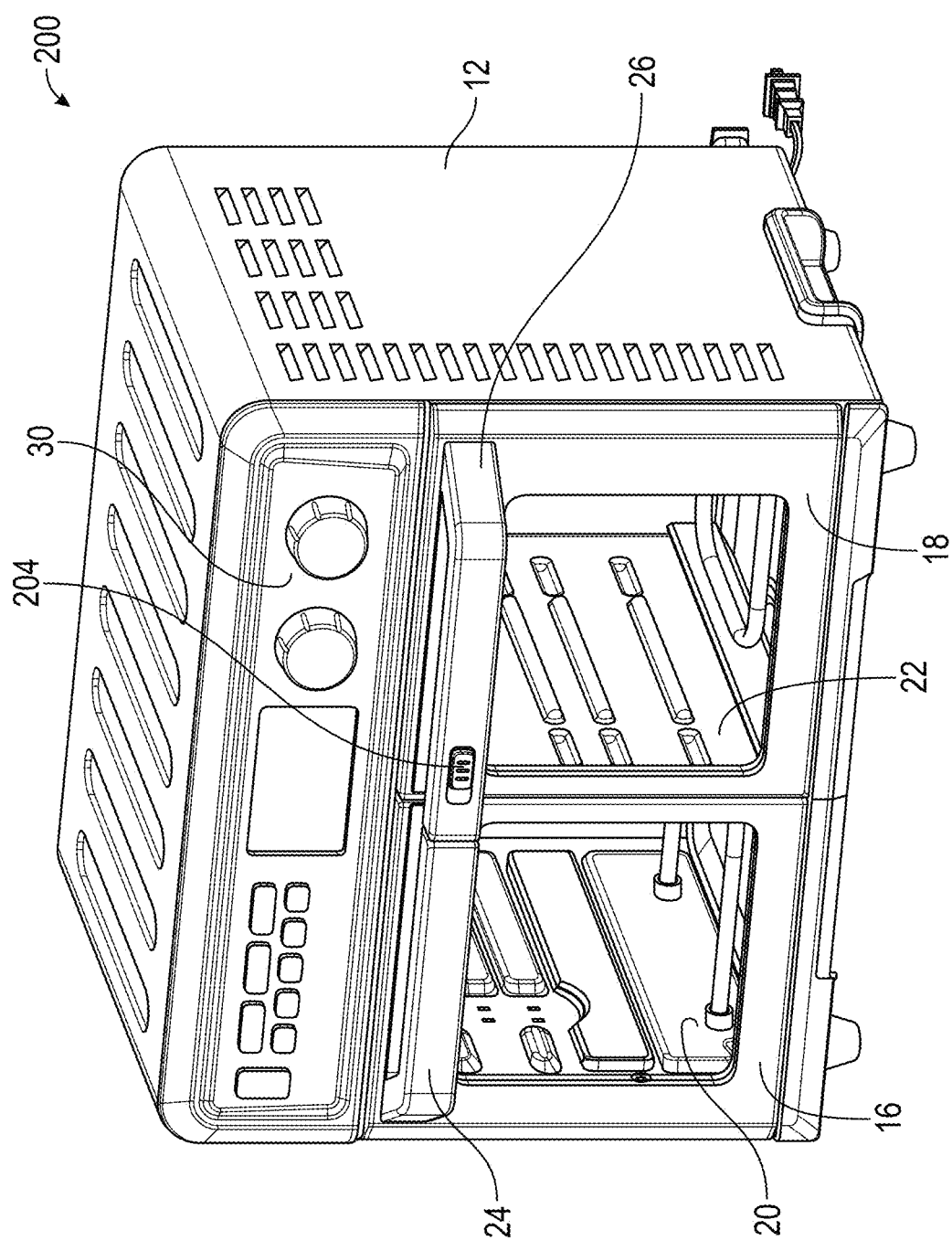
FIG. 24 is a perspective view of a cooking appliance having an alternative door locking mechanism, according to an embodiment of the present invention.
Figure 27:
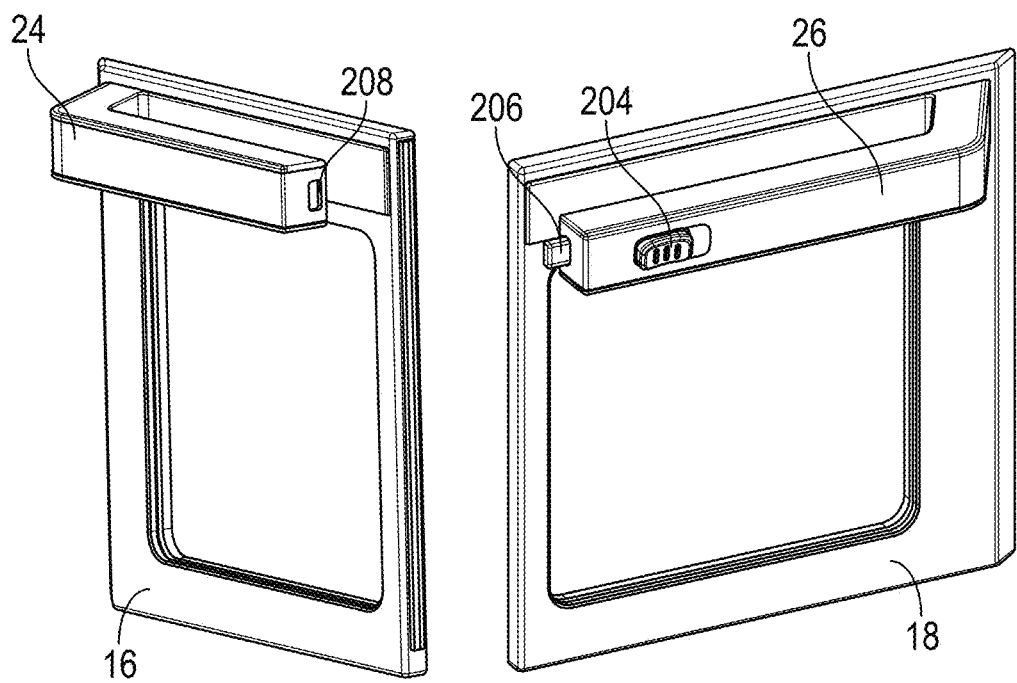
FIG. 27 is another rear, perspective view of the doors of the cooking appliance of FIG. 24.
Figure 28:
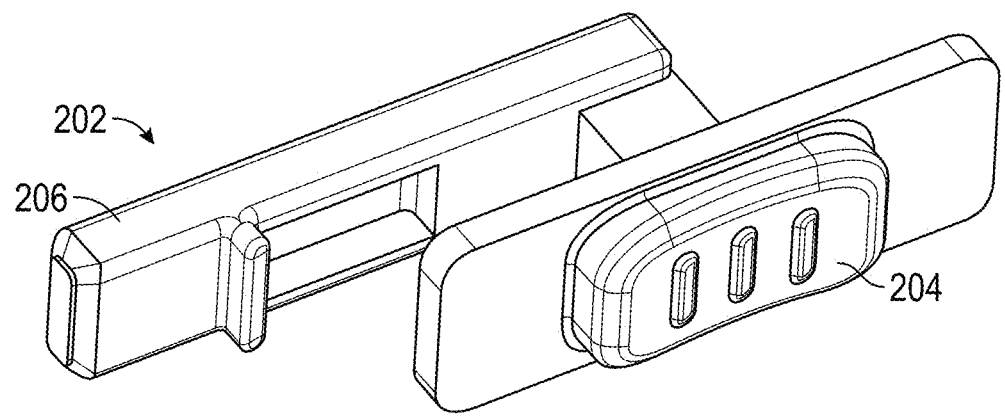
FIG. 28 is a front, perspective view of the locking mechanism of the doors of the cooking appliance of FIG. 24.

Turning now to FIGS. 24, a cooking appliance 200 according to another embodiment of the invention is illustrated. The cooking appliance 200 is identical to cooking appliance 10, where like reference numerals designate like parts. The cooking appliance 200, however, includes an alternative door locking mechanism. In particular, as best illustrated in FIGS. 24-30, rather than having depressible buttons that are used to selectively open the left door 16 or the right door 18, a sliding mechanism 202 is employed. In such embodiment, the right door 18 may include a slidable button 204 accessible from the front of the handle 26, and a locking bolt 206 rigidly connected to the slidable button 204 and disposed within the handle 26. The button 204 is slidable between a first position, where the distal end of the locking bolt 206 is retracted within the handle 26, and a second position, wherein the locking bolt 206 extends from the handle 26, as best shown in FIG. 27. As also shown in FIG. 27, the handle 24 of the left door 16 includes a slot 208 configured to receive the distal end of the locking bolt 26.

Figure 25:
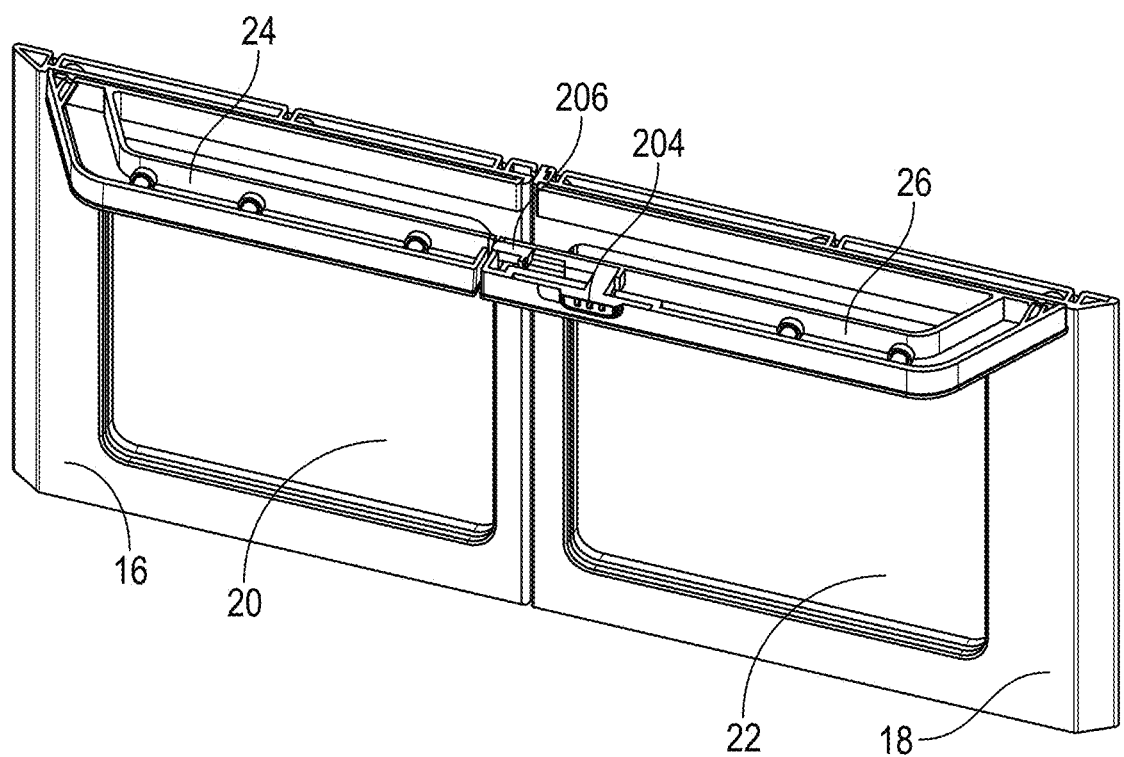
FIG. 25 is a front, perspective view of the doors of the cooking appliance of FIG. 24, showing internal components of the handles and a locking bolt in a retracted position.
Figure 26:
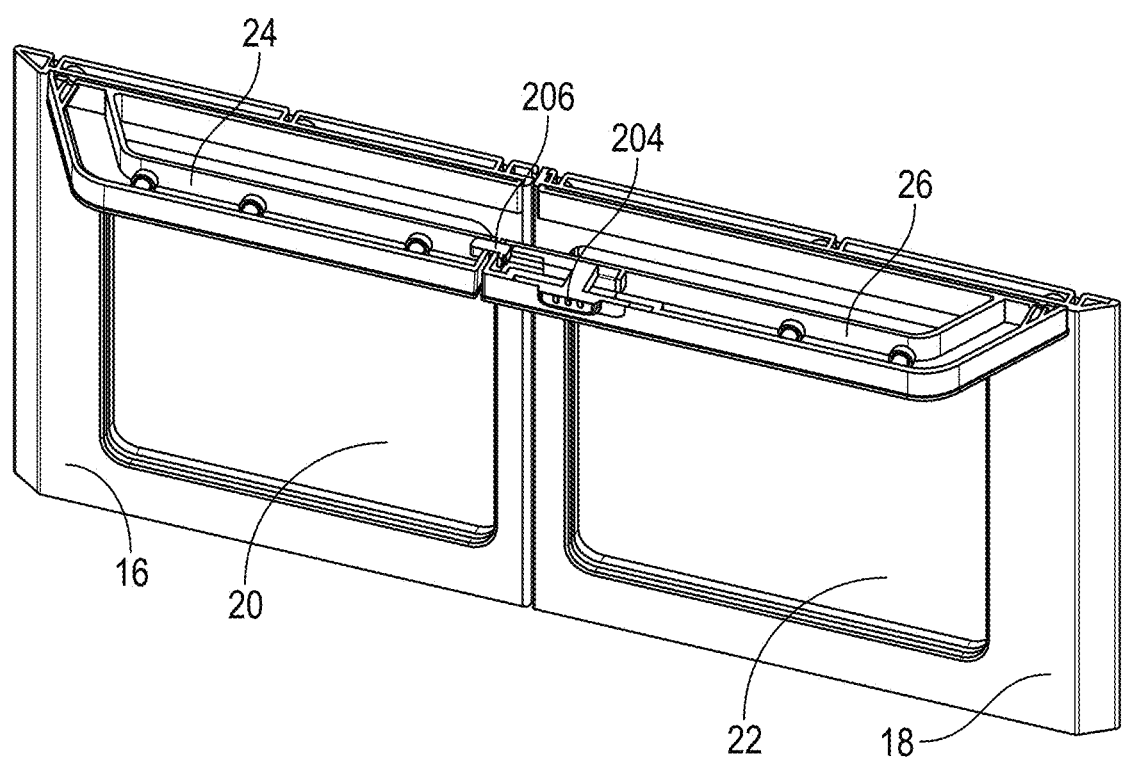
FIG. 26 is a front, perspective view of the doors of the cooking appliance of FIG. 24, showing internal components of the handle and the locking bolt in an extended position.
Figure 29:
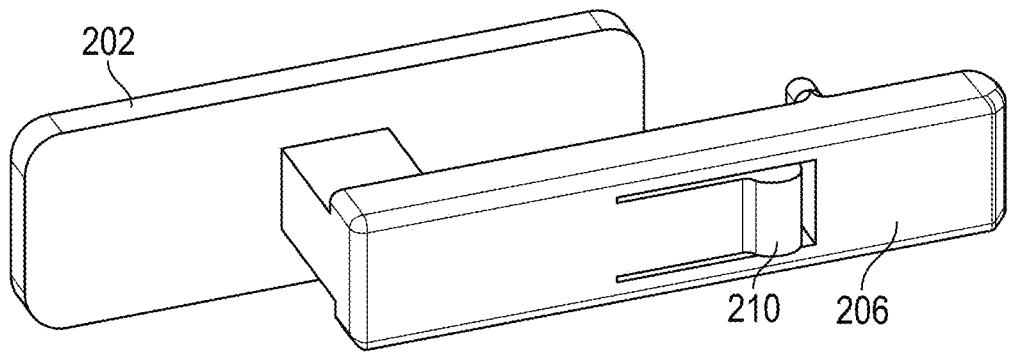
FIG. 29 is a rear, perspective view of the locking mechanism of the doors of the cooking appliance of FIG. 24.
Figure 30:
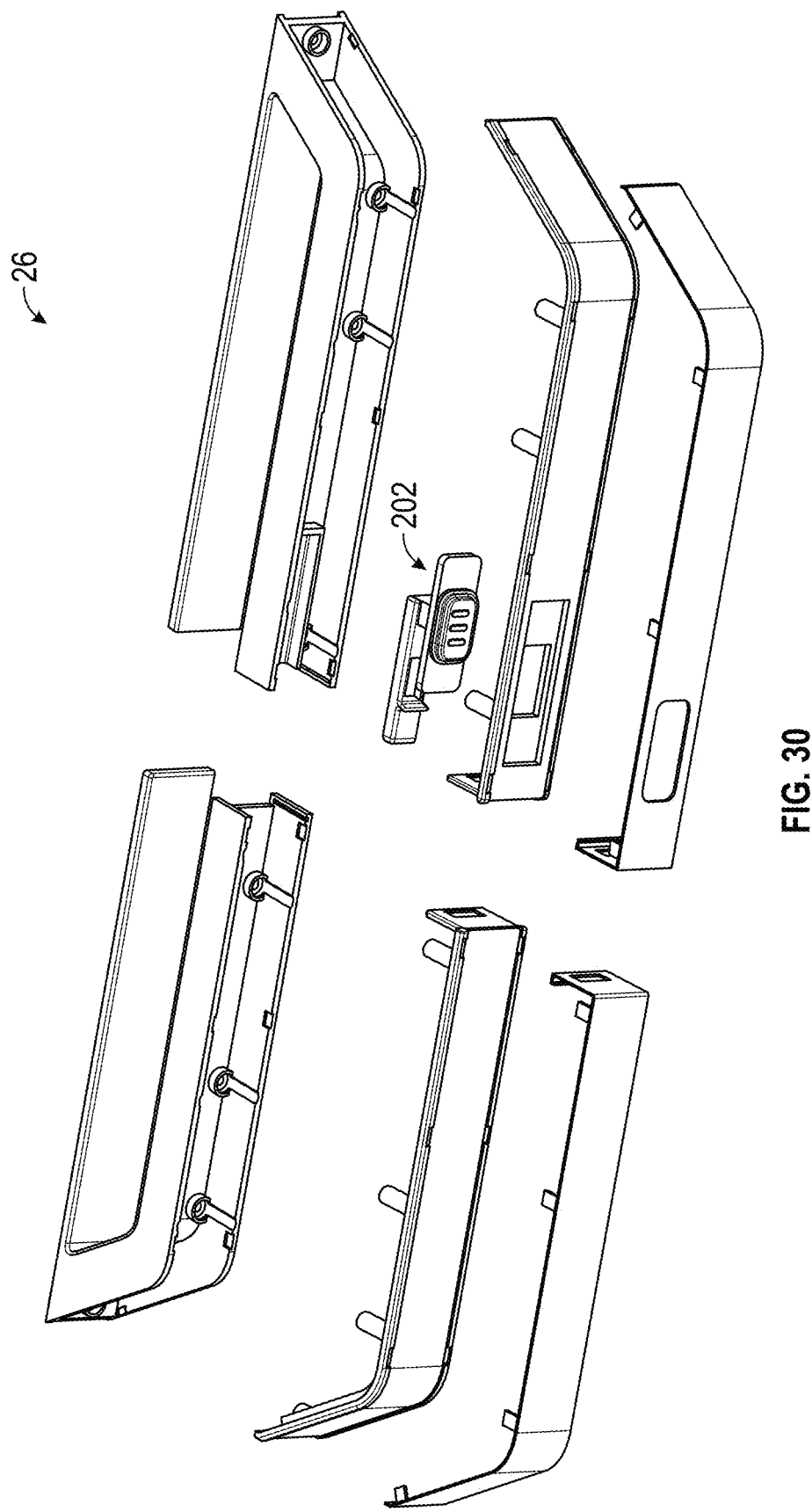
FIG. 30 is an exploded, perspective view of the handles of the doors of the cooking appliance of FIG. 24.
Figure 31:
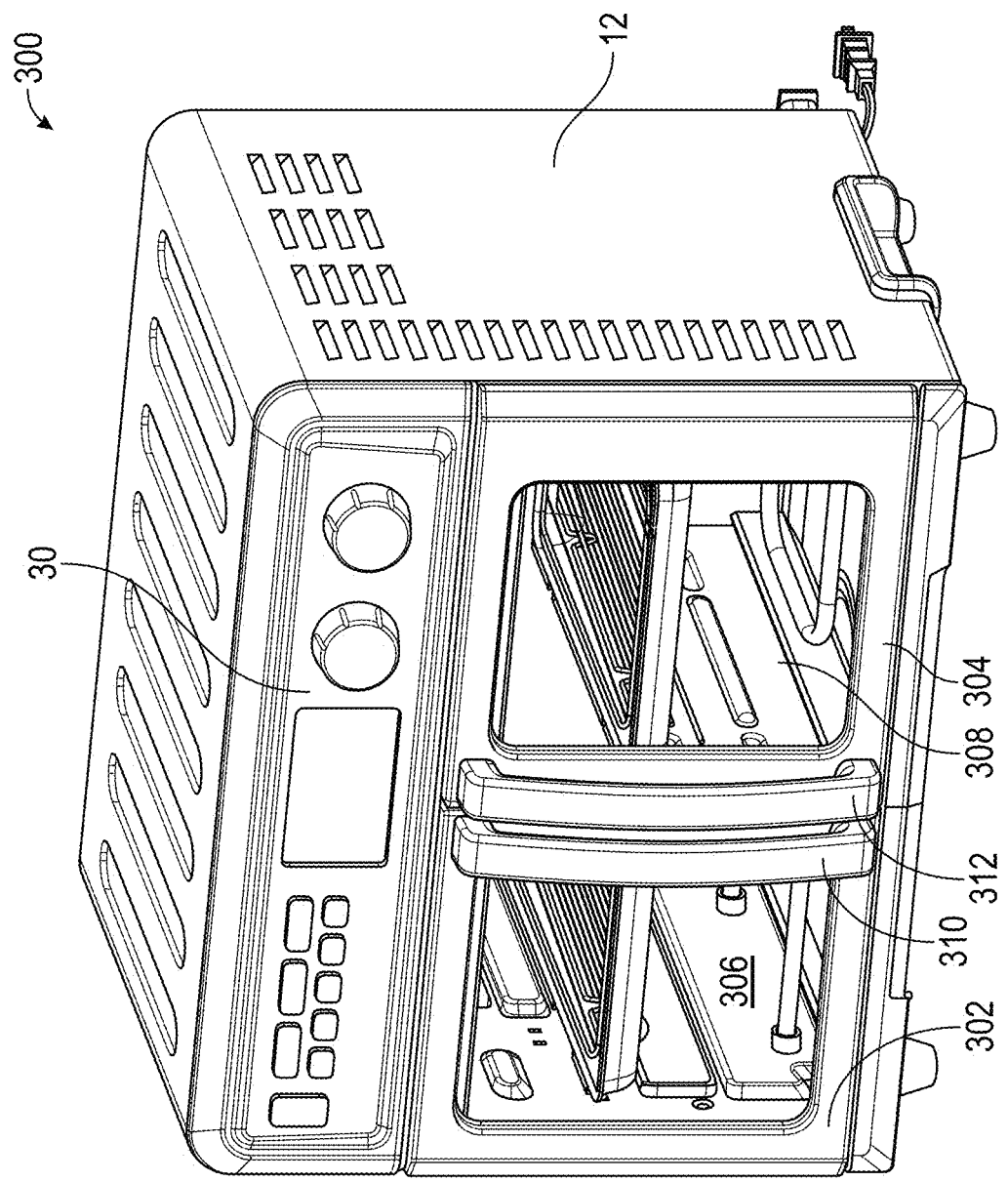
FIG. 31 is a perspective view of a cooking appliance having an alternative door configuration, according to an embodiment of the present invention.

In operation, the button 204 may be moved to the right to retract the locking bolt 206 within handle 26. In this position, the doors 16, 18 are decoupled from one another, as shown in FIG. 25, enabling the doors 16, 18 to be opened individually by pulling on the handles 24, 26, respectively. This is particularly useful when the divider of the cooking appliance 10 is in place and the cooking appliance 10 is in the dual oven cavity configuration. When it is desired that the doors are to be opened simultaneously, such as when the cooking appliance 10 is in a single oven cavity configuration, the button 204 may be slid to the left, which causes the locking bolt 26 to extend from the handle 26 and enter the slot 208 in the handle 24 of the door 16. In this position, the doors 16, 18 are locked together such that pulling on either handle 24, 26 will move both doors 16, 18 to the open position. As best shown in FIG. 29, in an embodiment, the rear side of the locking bolt 206 may include a resilient arm or detent 210 that retains the locking mechanism 202 in the locked or unlocked position. While the locking mechanism 202 is disclosed as being a part of the right door 18 and the slot as part of the left door 16, it is contemplated that such components may be reversed.

Figure 32:
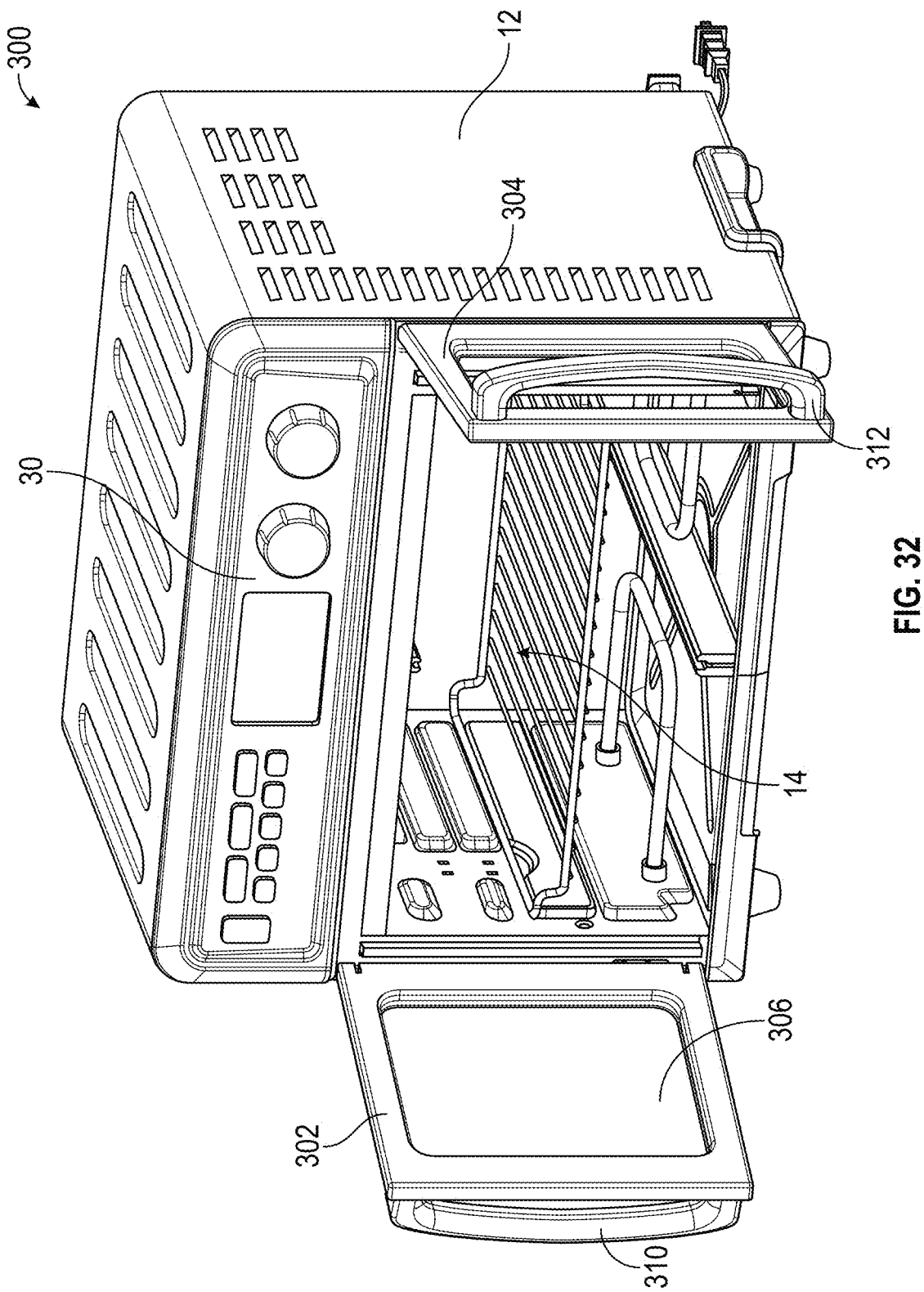
FIG. 32 is a perspective view of the cooking appliance of FIG. 31, showing the doors in the open position and with a single cavity configuration.
Figure 33:
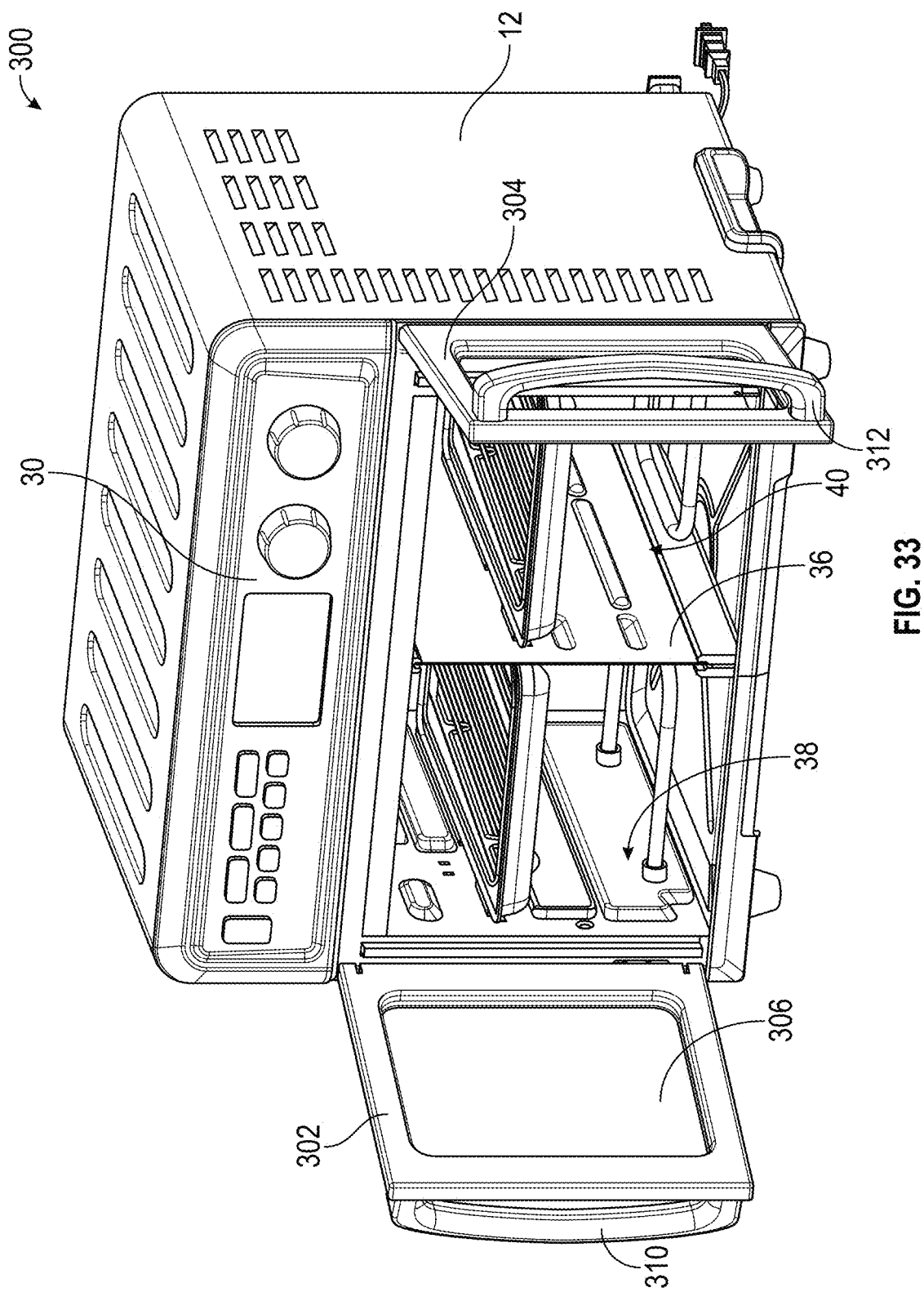
FIG. 33 is a perspective view of the cooking appliance of FIG. 31, showing the doors in the open position and with a dual cavity configuration.

Referring finally to FIGS. 30-33, a cooking appliance 300 according to another embodiment of the invention is illustrated. The cooking appliance 300 is identical to cooking appliance 10, where like reference numerals designate like parts. Rather than having doors 16, 18 that are mounted to the housing 16 at their lower edges and rotatable about a horizontal axis, the cooking appliance 300 includes French-type doors and, in particular, first and second doors 302, 304 mounted to the housing at outer, lateral edges, and rotatable about respective vertical axes. Similar to the doors 16, 18, the doors 302, 304 each include a transparent panel 306, 308, and include a vertically-oriented handle 310, 312, respectively. FIG. 32 illustrates both doors 302, 304 in the open position, with the cooking appliance 300 in a single cavity configuration, while FIG. 33 illustrates both doors 302, 304 in the open position, with the cooking appliance 300 in a dual cavity configuration with divider 36 present.

As will be appreciated, as disclosed above, the cooking appliance 10 (as well as cooking appliance 200 and 300) of the present invention is selectively configurable in a first cooking configuration, providing a single, large capacity oven cavity within which a variety of cooking modes may be carried out. In such a configuration, the heating elements and convection fan assemblies can be operated either collectively as a group, or separately. The cooking appliance 10 is also selectively configurable in a second cooking configuration, proving two separate, smaller capacity oven cavities within which a variety of cooking modes may be carried out. As discussed above, the separate oven cavities each feature independent control over the cooking functions carried out therein; namely, the separate oven cavities feature separate temperature control, as well as separate and independently controllable convection fan assemblies. The separate oven cavities are therefore able to operate as effectively separate toaster ovens (although embodied in a single housing).

While the cooking appliance of the present invention has been disclosed above as having, in the dual cavity configuration, two oven cavities or compartments of equal size, it is not intended that the present invention be so limited in this regard. In particular, it is contemplated that in an embodiment, the divider 36 may be offset to one side so as to provide a first oven cavity of a smaller capacity/volume and a second oven cavity of a larger capacity/volume.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A cooking appliance, comprising:
a housing having an internal compartment;
a divider positionable within the internal compartment for dividing the internal compartment into a first oven cavity and a second oven cavity;
a first heating element configured to heat the first oven cavity;
a second heating element configured to heat the second oven cavity;
a first door configured to enclose the first oven cavity;
a second door configured to enclose the second oven cavity; and
a mechanism for selectively linking the first door with the second door such that the first door and the second door can be opened simultaneously;
wherein the divider is at least one of retractable and/or removable.

2. The cooking appliance of claim 1, wherein:
the first heating element and the second heating element are independently controllable.

3. The cooking appliance of claim 1, further comprising:
a first convection fan assembly configured to provide a flow of air to the first oven cavity; and
a second convection fan assembly configured to provide a flow of air to the second oven cavity.

4. The cooking appliance of claim 1, wherein:
the first door and the second door are configured to be opened via rotation about a horizontal axis.

5. The cooking appliance of claim 1, wherein:
the first door and the second door are configured to be opened via rotation about respective vertical axes.

6. The cooking appliance of claim 1, wherein:
the mechanism is a locking mechanism configured to mechanically link the first door and the second door.

7. The cooking appliance of claim 6, wherein:
the first door and the second door are configured such that the first door and the second door can be opened simultaneously when only one of the doors is manipulated by a user.

8. The cooking appliance of claim 6, wherein:
the first door and the second door can be opened independently of one another.

9. The cooking appliance of claim 3, wherein:
the first heating element includes a lower heating element and upper heating element within the first oven cavity; and
the second heating element includes a lower heating element and an upper heating element within the second oven cavity.

10. The cooking appliance of claim 1, wherein:
the internal compartment includes a lower guide track and an upper guide track; and
wherein the divider is slidably received within the lower guide track and the upper guide track.

11. The cooking appliance of claim 1, wherein:
the first oven cavity has a first volume; and
the second oven cavity has a second volume;
wherein the first volume is greater than the second volume.

12. The cooking appliance of claim 1, wherein:
the divider has a plurality of rack supports on opposing sides of the divider.

13. The cooking appliance of claim 1, further comprising:
a first removable crumb tray located at the bottom of the first oven cavity; and
a second removable crumb tray located at the bottom of the second oven cavity.

14. The cooking appliance of claim 1, wherein:
the divider is foldable and is retained in the internal compartment to provide a single oven cavity.

* * * * *